(12) United States Patent
Miyajima

(10) Patent No.: US 12,547,093 B2
(45) Date of Patent: Feb. 10, 2026

(54) LIGHT SCANNING APPARATUS AND IMAGE FORMING APPARATUS

(71) Applicant: CANON KABUSHIKI KAISHA, Tokyo (JP)

(72) Inventor: Yu Miyajima, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 18/594,985

(22) Filed: Mar. 4, 2024

(65) Prior Publication Data
US 2024/0310748 A1    Sep. 19, 2024

(30) Foreign Application Priority Data
Mar. 14, 2023    (JP) .................................. 2023-039205

(51) Int. Cl.
G03G 15/04    (2006.01)
G03G 15/056    (2006.01)

(52) U.S. Cl.
CPC ....... G03G 15/0409 (2013.01); G03G 15/056 (2013.01)

(58) Field of Classification Search
CPC ............. G03G 15/0409; G03G 15/056; G03G 15/0435; G02B 26/101; G02B 26/12; G02B 26/123; G02B 26/124
See application file for complete search history.

(56) References Cited

FOREIGN PATENT DOCUMENTS

JP    2000267034 A    9/2000
JP    2011180581 A    9/2011

*Primary Examiner* — Douglas X Rodriguez
*Assistant Examiner* — Natasha Dephenia Quinn
(74) *Attorney, Agent, or Firm* — Canon U.S.A., Inc. IP Division

(57) ABSTRACT

Provided is an apparatus including: an element in which a fine structure changing a polarization state of a light flux from a light source is formed on at least one of an incident surface or an exit surface thereof; a deflecting unit deflecting light flux that has passed through optical element to scan a scanned surface in a main scanning direction; and an optical system guiding light flux deflected by deflecting unit to scanned surface, wherein fine structure includes a plurality of protruding portions each extending in a first direction, the plurality of protruding portions being arrayed in a second direction perpendicular to first direction, and wherein the following condition is satisfied:

$$1/20 \leq \Delta_1/\lambda_1 \leq 1/6,$$

where $\Delta_1$ represents a phase difference between first direction and second direction of birefringence caused by fine structure, and $\lambda_1$ represents a wavelength of light flux.

20 Claims, 9 Drawing Sheets

LIGHT SCANNING APPARATUS AND IMAGE FORMING APPARATUS

BACKGROUND

Technical Field

The aspect of the embodiments relates to a light scanning apparatus, and is more particularly for an image forming apparatus, for example, a laser beam printer (LBP), a digital copying machine, or a multifunction printer (MFP).

Description of the Related Art

Hitherto, in a light scanning apparatus, it has been known that, along with a difference in incident angle to a deflecting surface of a deflecting unit or a reflecting surface of a folding mirror between light fluxes scanning respective image heights of a scanned surface, the deflecting surface or the reflecting surface has different reflectivities with respect to the light fluxes, and thus the light fluxes cause uneven illuminance on the scanned surface.

In Japanese Patent Application Laid-Open No. 2000-267034, the following light scanning apparatus is disclosed. That is, a λ/2 plate is provided in an incident optical system so as to tilt a polarization direction of a light flux at the time of entering the deflecting unit by 45° From a sub-scanning direction in a cross section perpendicular to an optical axis. In this manner, in the deflecting surface of this deflecting unit, a change in reflectivity with respect to this light flux depending on the incident angle is reduced. This configuration suppresses uneven illuminance to be caused by the light fluxes on the scanned surface.

In the light scanning apparatus as disclosed in Japanese Patent Application Laid-Open No. 2000-267034, the apparatus is increased in size because the λ/2 plate is further provided in the incident optical system.

SUMMARY

According to the aspect of the embodiments, there is provided an apparatus including: a first element in which a first fine structure configured to change a polarization state of a first light flux emitted from a first light source is formed on at least one of an incident surface or an exit surface thereof; a deflecting unit configured to deflect the first light flux that has passed through the first element to scan a first scanned surface in a main scanning direction; and a first optical system configured to guide the deflected first light flux to the first scanned surface, wherein the first fine structure on at least one of the incident surface or the exit surface of the first element includes a plurality of protruding portions each extending in a first direction, the plurality of protruding portions being arrayed in a second direction perpendicular to the first direction, and wherein the following condition is satisfied:

$$1/20 \leq \Delta_1/\lambda_1 \leq 1/6,$$

where $\Delta_1$ represents a phase difference between the first direction and the second direction of birefringence caused by the first fine structure on at least one of the incident surface or the exit surface of the first optical element, and $\lambda_1$ represents a wavelength of the first light flux.

Further features of the disclosure will become apparent from the following description of exemplary embodiments with reference to the attached drawings.

DESCRIPTION OF THE EMBODIMENTS

A light scanning apparatus according to the present invention is described in detail below with reference to the accompanying drawings. Some of the drawings referred to below may be drawn in scales different from the actual scale for easier understanding of the present invention.

Further, in the following description, a main scanning direction refers to a direction in which a light flux is deflected and scanned by a deflecting unit. A sub-scanning direction refers to a direction parallel to a rotational axis of the deflecting unit. A main scanning cross section refers to a cross section perpendicular to the sub-scanning direction. A sub-scanning cross section refers to a cross section perpendicular to the main scanning direction.

First Embodiment

Hitherto, in a light scanning apparatus, it has been known that, along with a difference in incident angle to a deflecting surface of a deflecting unit or a reflecting surface of a folding mirror between light fluxes scanning respective image heights of a scanned surface, the deflecting surface or the reflecting surface has different reflectivities with respect to the light fluxes, and thus the light fluxes cause uneven illuminance on the scanned surface.

In addition, there has been proposed a light scanning apparatus in which a $\lambda/2$ plate is provided in an incident optical system so as to tilt a polarization direction of a light flux at the time of entering the deflecting unit by 45° From the sub-scanning direction in a cross section perpendicular to an optical axis. In this manner, in the deflecting surface of this deflecting unit, the change in reflectivity with respect to the light flux depending on the incident angle is reduced. This configuration suppresses uneven illuminance to be caused by the light fluxes in the scanned surface.

However, in such light scanning apparatus, because the $\lambda/2$ plate is further provided in the incident optical system, the apparatus is increased in size and is complicated. In addition, the cost of the apparatus is increased along with the cost required for manufacturing the $\lambda/2$ plate.

In view of the above, the present invention has an object to provide a small-sized and simple light scanning apparatus with which uneven illuminance on a scanned surface can be suppressed while an increase in cost is suppressed.

Figure 1A:
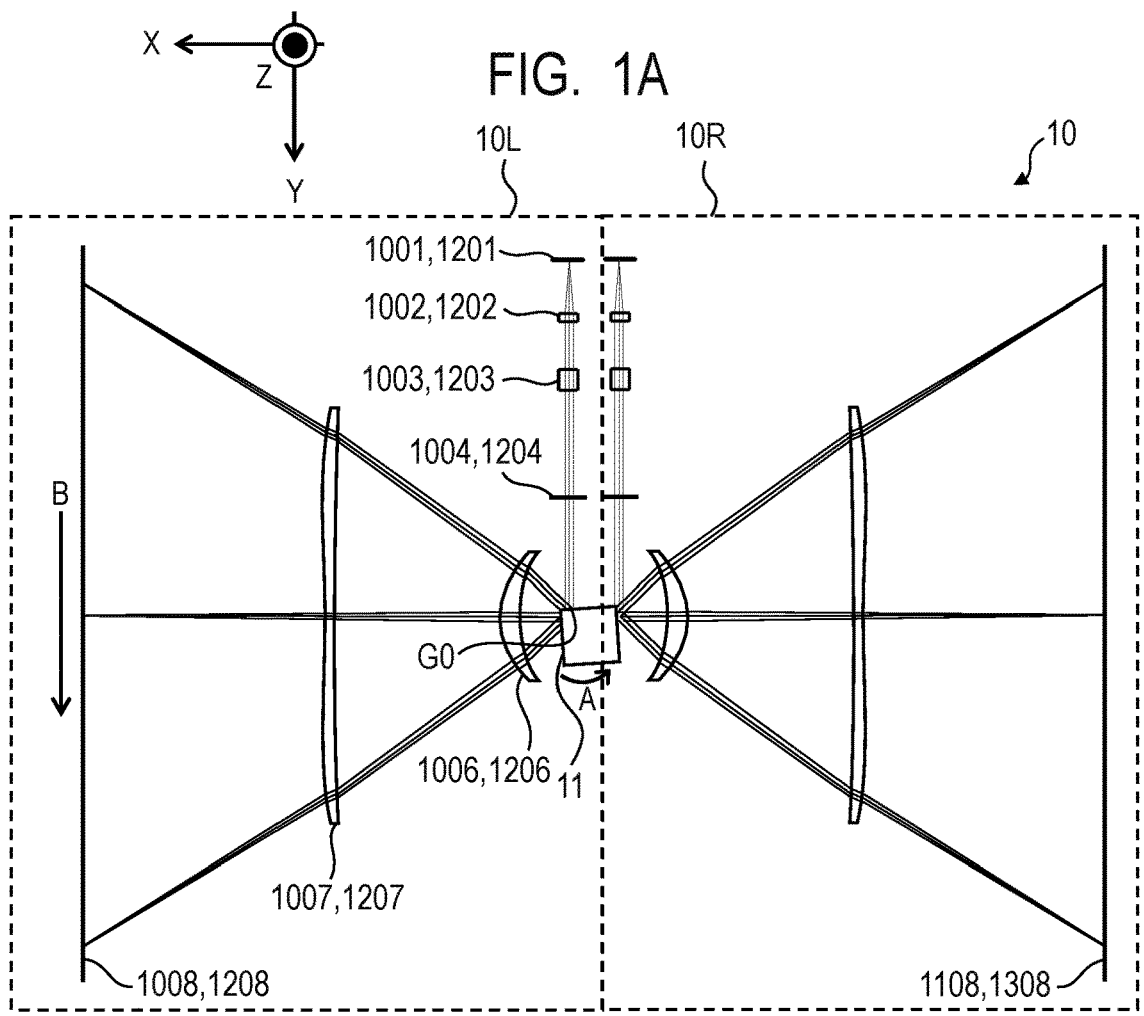
FIG. 1A is a developed view in a main scanning cross section of a light scanning apparatus according to a first embodiment of the present invention.

FIG. 1A shows a developed view in the main scanning cross section of a light scanning apparatus 10 according to a first embodiment of the present invention.

Figure 1B:
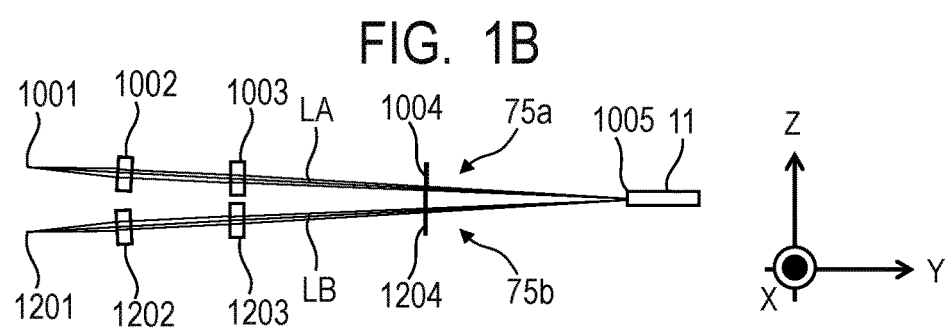
FIG. 1B is a partial developed view in a sub-scanning cross section of the light scanning apparatus according to the first embodiment.
Figure 1C:
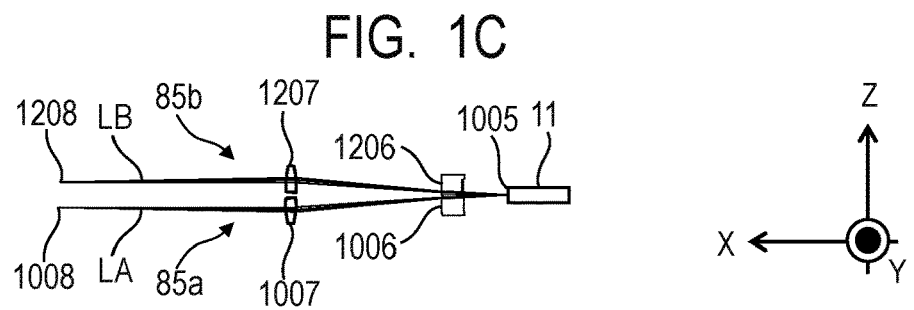
FIG. 1C is a partial developed view in the sub-scanning cross section of the light scanning apparatus according to the first embodiment.

FIG. 1B and FIG. 1C show developed views in the sub-scanning cross section of incident optical systems and scanning optical systems, respectively, which are included in the light scanning apparatus 10 according to the first embodiment.

As illustrated in FIG. 1A, the light scanning apparatus 10 includes a left-side scanning system 10L and a right-side scanning system 10R, which have the same configuration as each other, and are arranged symmetrically with respect to each other with a deflecting unit 11 interposed therebetween.

The left-side scanning system 10L and the right-side scanning system 10R scan first and second scanned surfaces 1008 and 1208 and third and fourth scanned surfaces 1108 and 1308, respectively, in an opposed manner.

Thus, the following configuration can be equally applied to both the left-side scanning system 10L and the right-side scanning system 10R, and hence only the left-side scanning system 10L is described below for the sake of simplification of description.

The light scanning apparatus 10 according to the present embodiment includes first and second light sources 1001 and 1201 and first and second collimator lenses 1002 and 1202 (first and fourth optical elements).

The light scanning apparatus 10 according to the present embodiment also includes first and second cylindrical lenses 1003 and 1203 (a third optical element) and first and second aperture stops 1004 and 1204.

The light scanning apparatus 10 according to the present embodiment also includes the deflecting unit 11, first fθ lenses 1006 and 1206, and second fθ lenses 1007 and 1207.

As each of the first and second light sources 1001 and 1201, an edge emitting laser diode for emitting a light flux having a wavelength of $\lambda=790$ nm is used.

Polarized light of light fluxes LA and LB (first and second light fluxes) emitted from the first and second light sources 1001 and 1201 is linearly polarized light substantially parallel to the main scanning cross section.

That is, the light fluxes LA and LB entering the deflecting unit 11 from the first and second light sources 1001 and 1201 at a time of reflection on a deflecting surface 1005 of the deflecting unit 11 have more p-polarized light components than s-polarized light components.

The first and second collimator lenses 1002 and 1202 convert the light fluxes LA and LB emitted from the first and second light sources 1001 and 1201, respectively, into parallel light fluxes.

It is assumed that the parallel light flux as used herein includes not only a strict parallel light flux but also substantially parallel light fluxes including a weak divergent light flux and a weak convergent light flux.

The first and second cylindrical lenses 1003 and 1203 each have a finite power (refractive power, optical power) in the sub-scanning cross section, and the light fluxes LA and LB that have passed through the first and second collimator lenses 1002 and 1202 are each condensed in the sub-scanning direction.

The first and second aperture stops 1004 and 1204 limit light flux diameters of the light fluxes LA and LB that have passed through the first and second cylindrical lenses 1003 and 1203, respectively.

In this manner, the light fluxes LA and LB emitted from the first and second light sources 1001 and 1201 are each condensed in the sub-scanning direction in a vicinity of the deflecting surface 1005 of the deflecting unit 11 to be imaged as a long line image in the main scanning direction.

The deflecting unit 11 deflects the light fluxes LA and LB entering the deflecting unit 11 by being rotated in a direction indicated by the arrow A in FIG. 1A by a motor (not shown) or another driving unit.

The deflecting unit 11 is formed of, for example, a polygon mirror.

The first fθ lens 1006 and the second fθ lens 1007 are each made of a resin material, and are each an anamorphic imaging lens having different powers in the main scanning cross section and in the sub-scanning cross section.

The first fθ lens 1006 and the second fθ lens 1007 condense (guide) the light flux LA deflected by the deflecting unit 11 on (to) the first scanned surface 1008.

Similarly, the first fθ lens 1206 and the second fθ lens 1207 are each made of a resin material, and are each an anamorphic imaging lens having different powers in the main scanning cross section and in the sub-scanning cross section.

The first fθ lens 1206 and the second fθ lens 1207 condense (guide) the light flux LB deflected by the deflecting unit 11 on (to) the second scanned surface 1208.

At this time, the deflecting unit 11 is being rotated in the direction indicated by the arrow A in FIG. 1A, and hence the deflected light fluxes LA and LB scan the first and second scanned surfaces 1008 and 1208, respectively, in a direction indicated by the arrow B in FIG. 1A.

In the light scanning apparatus 10 according to the present embodiment, a first incident optical system 75a is formed of the first collimator lens 1002, the first cylindrical lens 1003, and the first aperture stop 1004.

Similarly, a second incident optical system 75b is formed of the second collimator lens 1202, the second cylindrical lens 1203, and the second aperture stop 1204.

Meanwhile, in the light scanning apparatus 10 according to the present embodiment, a first scanning optical system 85a (a first imaging optical system) is formed of the first fθ lens 1006 and the second fθ lens 1007.

Similarly, a second scanning optical system 85b (a second imaging optical system) is formed of the first fθ lens 1206 and the second fθ lens 1207.

In the light scanning apparatus 10 according to the present embodiment, optical axes of the first and second incident optical systems 75a and 75b form angles of α=−3.0° and +3.0°, respectively, with respect to the main scanning cross section when viewed in the sub-scanning cross section.

In the present embodiment, as the first and second scanned surfaces 1008 and 1208, first and second photosensitive drums 1008 and 1208 are used.

Further, a light exposure distribution in the sub-scanning direction on the first and second photosensitive drums 1008 and 1208 is created by rotating the first and second photosensitive drums 1008 and 1208 in the sub-scanning direction for each main scanning light exposure.

As described later, reflecting members for folding optical paths are provided between the deflecting unit 11 and the fθ lenses included in the first and second scanning optical systems 85a and 85b.

Next, various characteristics of the first incident optical system 75a and the first scanning optical system 85a of the light scanning apparatus 10 according to the present embodiment are shown in Table 1 and Table 2.

It is only required to change signs of Z coordinates and elevation angles of the first incident optical system 75a and the first scanning optical system 85a in order to obtain various characteristics of those of the second incident optical system 75b and the second scanning optical system 85b, respectively. Thus, description of the second incident optical system 75b and the second scanning optical system 85b is omitted in Table 1 and Table 2 and the following description thereof.

TABLE 1

| Various characteristics of first light source 1001 | | | Arrangement | | |
|---|---|---|---|---|---|
| Wavelength | λ(nm) | 790 | From first light source 1001 to first collimator lens 1002 | d0 (mm) | 18.31 |
| Polarized light when entering deflecting surface 1005 of deflecting unit 11 | | P-polarized light | From incident surface of first collimator lens 1002 to exit surface of first collimator lens 1002 | d1 (mm) | 3.00 |
| Stop shape | | | | | |
| | Main scanning direction | Sub-scanning direction | From exit surface of first collimator lens 1002 to incident surface of first cylindrical lens 1003 | d2 (mm) | 16.00 |
| First aperture stop 1004 | 3.050 | 0.782 | | | |
| Refractive index | | | From incident surface of first cylindrical lens 1003 to exit surface of first cylindrical lens 1003 | d3 (mm) | 7.00 |
| First collimator lens 1002 | N1 | 1.524 | | | |
| First cylindrical lens 1003 | N2 | 1.524 | From exit surface of first cylindrical lens 1003 to first aperture stop 1004 | d4 (mm) | 36.61 |
| Optical element shape | | | | | |
| | | Axial-symmetry shape | From first aperture stop 1004 to deflection reference point G0 | d5 (mm) | 40.33 |
| Curvature radius of incident surface of first collimator lens 1002 | r1a (mm) | −10.202 | Incident angle of light exiting first aperture stop 1004 to deflecting unit 11 in main scanning cross section | A1 (deg) | 90.00 |
| Conic constant of incident surface of first collimator lens 1002 | k | −2.334 | Incident angle of light exiting first aperture stop 1004 to deflecting unit 11 in sub-scanning cross section | A3 (deg) | −3.00 |
| Curvature radius of exit surface of first collimator lens 1002 | r1b (mm) | ∞ | | | |

TABLE 1-continued

|  |  | Main scanning direction | Sub-scanning direction |
|---|---|---|---|
| Curvature radius of incident surface of first cylindrical lens 1003 | r2a (mm) | ∞ | −41.280 |
| Curvature radius of exit surface of first cylindrical lens 1003 | r2b (mm) | ∞ | ∞ |

TABLE 2

| fθ coefficient, scanning width, maximum angle of view | | | Meridional line shape of first fθ lens 1006 | | | Meridional line shape of second fθ lens 1007 | | |
|---|---|---|---|---|---|---|---|---|
| fθ coefficient | k (mm/rad) | 146 | | Incident surface Side opposite to light source side | Exit surface Side opposite to light source side | | Incident surface Side opposite to light source side | Exit surface Side opposite to light source side |
| Scanning width | W (mm) | 230 | | | | | | |
| Maximum angle of view | θ (deg) | 45.1 | R | −51.137 | −30.538 | R | −10000 | 281.813 |
|  | Refractive index | | ku | 3.78E+00 | −3.368E+00 | ku | 0 | −5.485E+01 |
| Refractive index of first fθ lens 1006 | N5 | 1.528 | B4u | 7.252E−06 | −1.090E−05 | B4u | 0 | −3.264E−07 |
| Refractive index of second fθ lens 1007 | N6 | 1.2585 | B6u | 1.546E−08 | 1.615E−08 | B6u | 0 | −4.228E−11 |
|  | Deflecting unit 11 | | B8u | −6.679E−11 | −2.346E−11 | B8u | 0 | −4.867E−15 |
| Number of deflecting surfaces |  | 4 | B10u | 8.958E−14 | −7.706E−15 | B10u | 0 | 3.418E−19 |
| Circumradius | Rpol (mm) | 10 | B12u | 0 | 0 | B12u | 0 | −1.028E−23 |
| (Center of rotation) − (deflection reference point G0) (optical axis direction) | Xpol (mm) | 5.74 | | Light source side | Light source side | | Light source side | Light source side |
| (Center of rotation) − (deflection reference point G0) (main scanning direction) | Ypol (mm) | −4.26 | kl | 3.782E+00 | −3.368E+00 | kl | 0 | −5.485E+01 |
| Arrangement of first scanning optical system 85a | | | B4l | 7.252E−06 | −1.101E−05 | B4l | 0 | −3.279E−07 |
| From deflection reference point G0 to incident surface of first fθ lens 1006 | d12 (mm) | 17.00 | B6l | 1.546E−08 | 1.662E−08 | B6l | 0 | 4.348E−11 |
|  |  |  | B8l | −6.679E−11 | −2.468E−11 | B8l | 0 | −5.180E−15 |
| From incident surface of first fθ lens 1006 to exit surface of first fθ lens 1006 | d13 (mm) | 6.70 | B10l | 8.958E−14 | −6.273E−15 | B10l | 0 | 3.783E−19 |
|  |  |  | B12l | 0 | 0 | B12l | 0 | −1.200E−23 |
| From exit surface of first fθ lens 1006 to incident surface of second fθ lens 1007 | d14 (mm) | 72.30 | | Sagittal line shape of first fθ lens 1006 | | | Sagittal line shape of second fθ lens 1007 | |
|  |  |  | | Incident surface | Exit surface | | Incident surface | Exit surface |

TABLE 2-continued

| | | | | Sagittal line R change | Sagittal line R change | | Sagittal line R change | Sagittal line R change |
|---|---|---|---|---|---|---|---|---|
| From incident surface of second fθ lens 1007 to exit surface of second fθ lens 1007 | d15 (mm) | 3.50 | r | −17.000 | −14.556 | r | 23.575 | −1000.000 |
| From exit surface of second fθ lens 1007 to first scanned surface 1008 | d16 (mm) | 68.50 | E1<br>E2 | −0.005415295<br>0.002759211 | −0.0030636<br>0.000223 | E1<br>E2 | 1.576E−04<br>7.982E−05 | 0.000E+00<br>0.000E+00 |
| From deflection reference point G0 to incident surface of second fθ lens 1007 | L1 (mm) | 96.00 | E3<br>E4 | 4.63361E−05<br>2.44549E−06 | 1.10195E−05<br>1.436E−07 | E3<br>E4 | 0<br>−4.320E−09 | 0<br>0.000E+00 |
| From deflection reference point G0 to first scanned surface 1008 | T1 (mm) | 168.00 | E5<br>E6 | 0<br>7.82039E−09 | 0<br>0.000E+00 | E5<br>E6 | 0<br>2.334E−14 | 0<br>0.000E+00 |
| Sub-scanning decentering amount of second fθ lens 1007 | shiftZ (mm) | −6.86 | E7 | 0 | 0 | E7 | 0 | 0 |
| Sub-scanning magnification of first scanning optical system 85a | β | 1.02 | E8 | 0 | 0 | E8 | −8.605E−18 | 0.000E+00 |
| | | | E9<br>E10 | 0<br>0 | 0<br>0 | E9<br>E10 | 0<br>0 | 0<br>0 |
| | | | | Sagittal line tilt | Sagittal line tilt | | Sagittal line tilt | Sagittal line tilt |
| | | | M0_1 | −0.2 | −0.2618 | M0_1 | −0.1965 | 0.0207 |
| | | | M1_1 | 0.00022893 | 3.225E−04 | M1_1 | 0.0000000 | −0.0000305 |
| | | | M2_1 | 0.000185711 | 3.739E−05 | M2_1 | 8.809E−06 | −1.337E−05 |
| | | | M3_1 | −1.71779E−06 | −1.738E−06 | M3_1 | 0.000E+00 | 6.382E−09 |
| | | | M4_1 | −5.9373E−08 | 9.150E−08 | M4_1 | −2.512E−09 | 9.477E−10 |
| | | | M5_1 | 0 | 0 | M5_1 | 0.000E+00 | −5.054E−14 |
| | | | M6_1 | 0 | 0 | M6_1 | 2.908E−14 | −3.828E−13 |
| | | | M7_1 | 0 | 0 | M7_1 | 0.000E+00 | −1.696E−16 |
| | | | M8_1 | 0 | 0 | M8_1 | 1.548E−16 | 1.056E−16 |
| | | | M9_1 | 0 | 0 | M9_1 | 0.000E+00 | 1.463E−20 |
| | | | M10_1 | 0 | 0 | M10_1 | −3.590E−12 | 6.188E−21 |
| | | | M11_1 | 0 | 0 | M11_1 | 0 | 0 |
| | | | M12_1 | 0 | 0 | M12_1 | 0 | 0 |

In Table 1 and Table 2, it is assumed that an intersection G0 (hereinafter referred to as "deflection reference point G0") between an on-axis light flux LAon and the deflecting unit 11 is an origin, the main scanning direction is a Y-axis, the sub-scanning direction is a Z-axis, and a direction perpendicular to the Y-axis and the Z-axis is an X-axis.

In Table 2, "E-x" means "×10$^{-x}$".

An aspherical shape of each lens surface of each of the first and second collimator lenses 1002 and 1202 provided in the light scanning apparatus 10 according to the present embodiment is expressed by Expression (1) below.

$$y = \frac{\frac{x^2 + z^2}{R}}{1 + \sqrt{1 - (1+k)\left(\frac{\sqrt{x^2+z^2}}{R}\right)^2}} \tag{1}$$

In Expression (1), R represents a curvature radius, and "k" represents a conic constant.

Further, an aspherical shape (a meridional line shape) of each lens surface of each of the first fθ lenses 1006 and 1206 and the second fθ lenses 1007 and 1207 provided in the light scanning apparatus 10 according to the present embodiment in the main scanning cross section is expressed by Expression (2) below.

$$x = \frac{\frac{y^2}{R}}{1 + \sqrt{1 - (1+k)\left(\frac{y}{R}\right)^2}} + \sum_{i=4}^{12} B_i y^i \tag{2}$$

Expression (1) and Expression (2) use a local coordinate system in which a surface vertex which is an intersection of each lens surface (optical surface) with the optical axis is set as an origin, and it is assumed that a traveling direction of the light flux (that is, the optical axis) is an x-axis, an axis orthogonal to the x-axis in the main scanning cross section is a y-axis, and an axis orthogonal to the x-axis in the sub-scanning cross section is a z-axis.

Further, the local coordinate system is also used in Expression (3) and Expression (4) below.

In Expression (2), Bi (i=4, 6, 8, 10, 12) represents an aspherical coefficient.

When the aspherical coefficient Bi differs between a plus side and a minus side in terms of "y", as shown in Table 2, a suffix "u" is added to the coefficient on the plus side (namely, Biu), and a suffix "l" is added to the coefficient on the minus side (namely, Bil).

An aspherical shape (a sagittal line shape) of each lens surface of each of the first fθ lenses 1006 and 1206 and the second fθ lenses 1007 and 1207 in the sub-scanning cross section is expressed by Expression (3) below.

$$S = \frac{\frac{z^2}{r'}}{1 + \sqrt{1 - \left(\frac{z}{r'}\right)^2}} + \sum_{j=0}^{12}\sum_{k=1}^{1} M_{jk} y^j z^k \qquad (3)$$

In Expression (3), $M_{jk}$ (where j=0 to 12 and k=1) represents an aspherical coefficient.

A sagittal line tilt amount in the present embodiment refers to $M_{01}$. Thus, a sagittal line tilt surface refers to a surface having $M_{01}$ that is not 0, and a sagittal line tilt changing surface refers to a surface having at least one of $M_{j1}$ (where j=1 to 12) that is not 0.

A curvature radius r' in the sub-scanning cross section continuously changes in accordance with a y-coordinate of the lens surface as expressed in Expression (4).

$$r' = r\left(1 + \sum_{j=1}^{10} E_j y^j\right) \qquad (4)$$

In Expression (4), "r" represents a curvature radius on the optical axis, and $E_j$ (where j=1 to 10) represents a variation coefficient.

Next, features of the light scanning apparatus 10 according to the present embodiment and effects to be obtained thereby are described.

As described above, in the light scanning apparatus 10 according to the present embodiment, the light fluxes LA and LB that have passed through the respective first and second incident optical systems 75*a* and 75*b* enter the deflecting unit 11 so as to be deflected, thereby scanning the respective first and second scanned surfaces 1008 and 1208 in a direction indicated by the arrow B in FIG. 1A.

At this time, an upstream edge of a scanning region of each of the first and second scanned surfaces 1008 and 1208 is referred to as "minus image height," and a downstream edge thereof is referred to as "plus image height."

Further, as described below, a light flux scanning the minus image height and a light flux scanning the plus image height have different incident angles to the deflecting unit 11 from each other.

Figure 2:
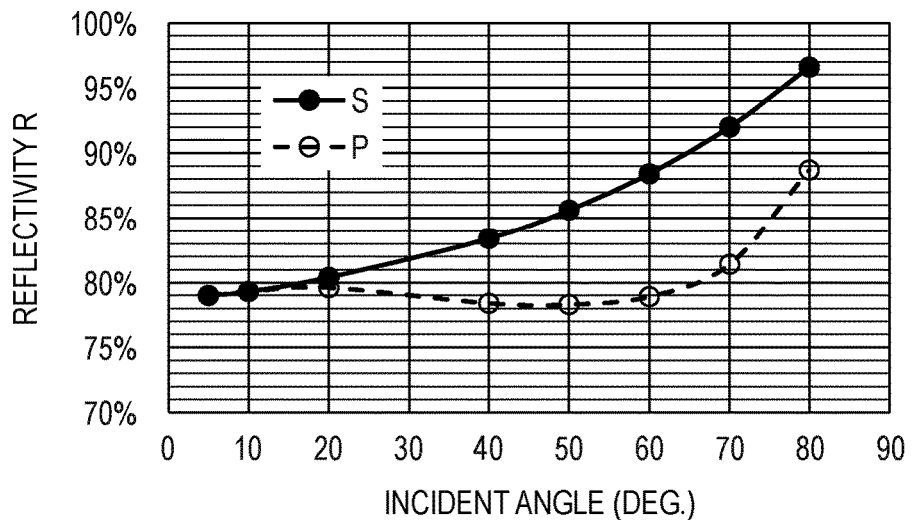
FIG. 2 is a graph for showing incident angle dependence of a reflectivity of a deflecting surface of a deflecting unit included in the light scanning apparatus according to the first embodiment.

FIG. 2 shows incident angle dependence of a reflectivity R of the deflecting surface 1005 of the deflecting unit 11 provided in the light scanning apparatus 10 according to the present embodiment.

Specifically, FIG. 2 shows incident angle dependence of a reflectivity Rp and a reflectivity Rs of the deflecting surface 1005 of the deflecting unit 11 with respect to a light flux having P polarization and a light flux having S polarization, respectively.

As described above, in the light scanning apparatus 10 according to the present embodiment, the light fluxes LA and LB pass through the respective first and second incident optical systems 75*a* and 75*b* so as to be incident on the deflecting unit 11 and be deflected as light fluxes having almost only P polarization.

Further, in the light scanning apparatus 10 according to the present embodiment, when the light fluxes LA and LB scan the minus image heights of the respective first and second scanned surfaces 1008 and 1208, the light fluxes LA and LB are incident on the deflecting unit 11 at an incident angle of 22.6°, and when the light fluxes LA and LB scan the plus image heights thereof, the light fluxes LA and LB are incident on the deflecting unit 11 at an incident angle of 67.6°.

Thus, the reflectivity of the deflecting surface 1005 of the deflecting unit 11 with respect to the light fluxes LA and LB scanning the minus image heights of the respective first and second scanned surfaces 1008 and 1208 is Rp=79.5% as shown in FIG. 2.

Further, the reflectivity of the deflecting surface 1005 of the deflecting unit 11 with respect to the light fluxes LA and LB scanning the plus image heights of the respective first and second scanned surfaces 1008 and 1208 is Rp=80.4% as shown in FIG. 2.

Thus, it is understood that, in each of the first and second scanned surfaces 1008 and 1208, a light amount ratio difference $\Delta R_I$ between image heights as expressed by Expression (5) below is caused between the minus image height and the plus image height due to the reflection on the deflecting surface 1005 of the deflecting unit 11.

$$\Delta R_I = \frac{79.5}{\left(\frac{79.5 + 80.4}{2}\right)} - \frac{80.4}{\left(\frac{79.5 + 80.4}{2}\right)} = -1.1\% \qquad (5)$$

The light amount ratio difference $\Delta R_I$ between image heights as used herein refers to an amount defined by a difference between a light amount ratio obtained by dividing a light amount at the minus image height by an average light amount of the minus image height and the plus image height and a light amount ratio obtained by dividing the light amount at the plus image height by the average light amount.

Further, although specific discussion of numerical values is omitted, when the light fluxes LA and LB are reflected by the deflecting surface 1005 of the deflecting unit 11, phases are also added to the light fluxes LA and LB depending on the incident angles and the polarization states of the light fluxes LA and LB.

That is, when the light fluxes LA and LB are reflected by the deflecting surface 1005 of the deflecting unit 11, not only the light amounts of the light fluxes LA and LB but also the polarization states of the light fluxes LA and LB change.

Further, the light fluxes LA and LB whose polarization states have been changed by being deflected by the deflecting unit 11 are incident on the respective first fθ lenses 1006 and 1206.

As in the light scanning apparatus 10 according to the present embodiment, when the first fθ lenses 1006 and 1206 are made of a resin material and also have birefringence, the polarization states of the respective light fluxes LA and LB further change by passing through the first fθ lenses 1006 and 1206.

Figure 3:
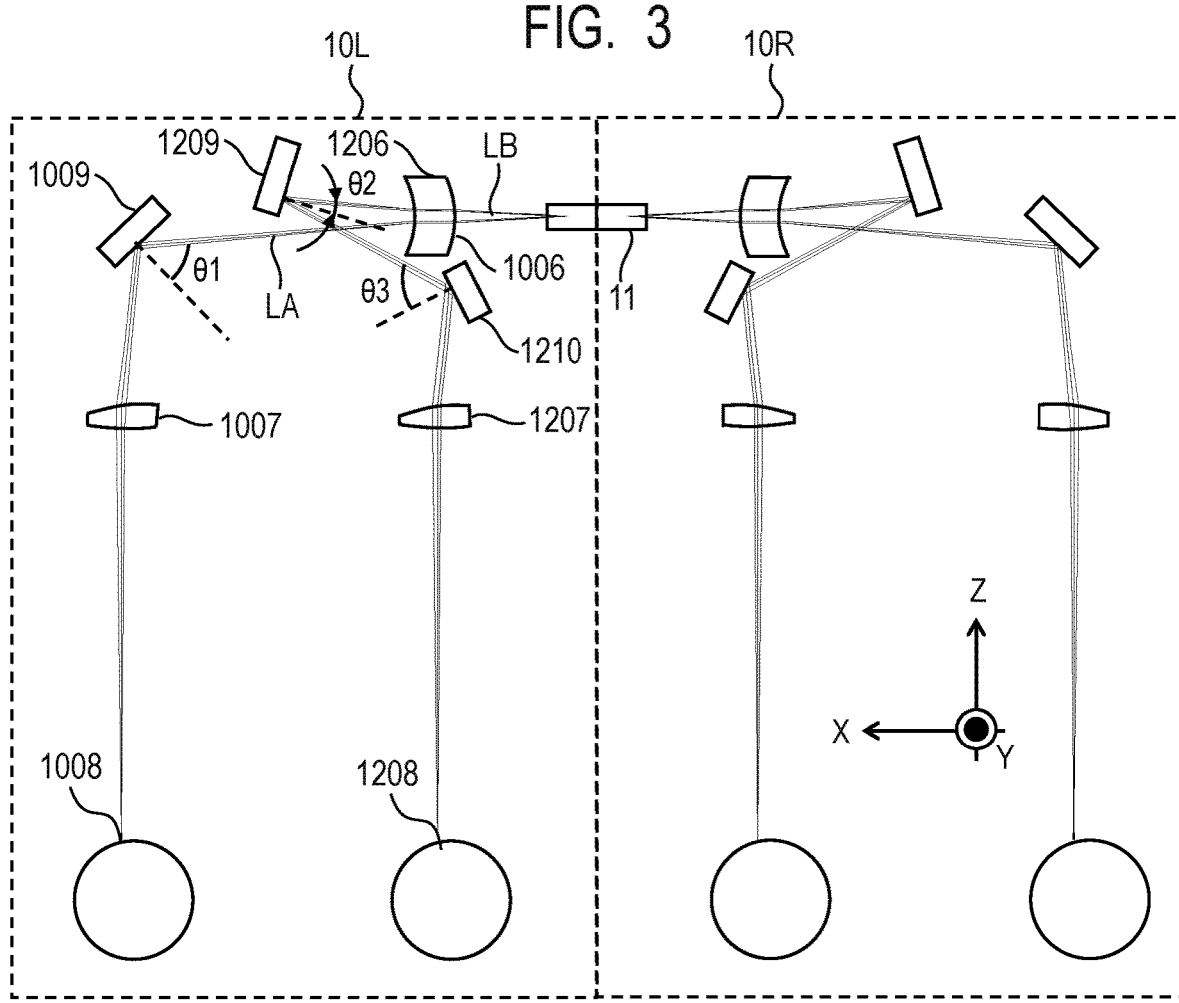
FIG. 3 is a sub-scanning cross sectional view of a scanning optical system included in the light scanning apparatus according to the first embodiment.

FIG. 3 shows a sub-scanning cross sectional view of the first and second scanning optical systems 85*a* and 85*b* included in the light scanning apparatus 10 according to the present embodiment.

As illustrated in FIG. 3, the light scanning apparatus 10 according to the present embodiment includes folding mirrors 1009, 1209, and 1210 (reflecting members).

Further, after the light flux LA deflected by the deflecting unit 11 passes through the first fθ lens 1006, the light flux LA is folded (reflected) by the folding mirror 1009 so as to travel toward the first scanned surface 1008.

Further, after the light flux LB deflected by the deflecting unit 11 passes through the first fθ lens 1206, the light flux LB is folded (reflected) by the folding mirrors 1209 and 1210 so as to travel toward the second scanned surface 1208.

Figure 4:
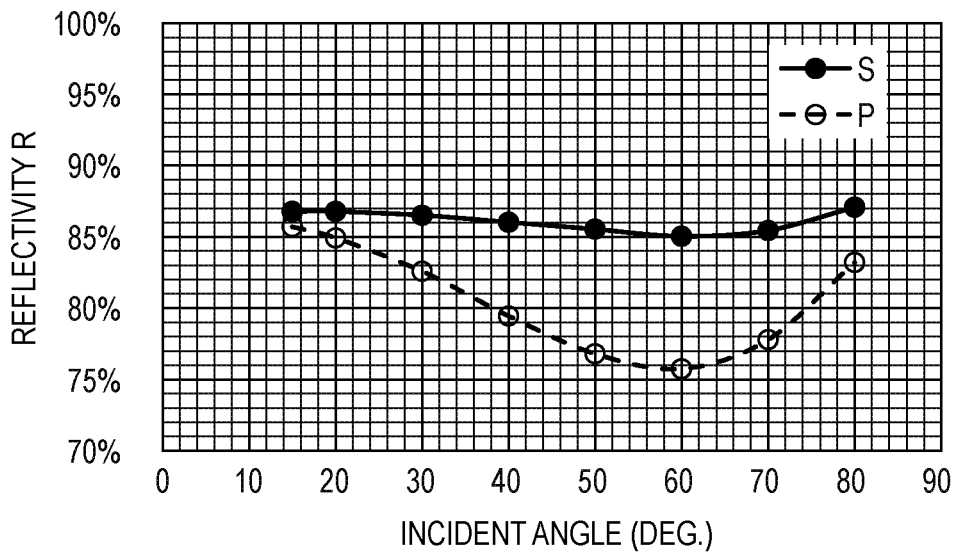
FIG. 4 is a graph for showing incident angle dependence of a reflectivity of a folding mirror included in the light scanning apparatus according to the first embodiment.

FIG. 4 shows incident angle dependence of a reflectivity R of each of the folding mirrors 1009, 1209, and 1210 provided in the light scanning apparatus 10 according to the present embodiment.

Specifically, FIG. 4 shows incident angle dependence of a reflectivity Rp and a reflectivity Rs of each of the folding mirrors 1009, 1209, and 1210 with respect to a light flux having P polarization and a light flux having S polarization, respectively.

First, the light flux LA is discussed. An incident angle $\theta_1$ of the light flux LA with respect to the folding mirror 1009 is about 58.4° in both of a case of scanning the minus image height and a case of scanning the plus image height.

Thus, the reflectivities of the folding mirror 1009 with respect to the light flux LA scanning the minus image height and the light flux LA scanning the plus image height are, as shown in FIG. 4, $R_p$=75.7% and $R_s$=85.1%.

In this case, as described above, the polarization state of the light flux LA is changed by being deflected by the deflecting unit 11, and hence the reflectivity R of the folding mirror 1009 with respect to the light flux LA varies depending on the polarization state of the light flux LA.

Specifically, when an intensity rate of P-polarized light and an intensity rate of S-polarized light in the light flux LA at the time of entering the folding mirror 1009 are represented by "α" and (1−α), respectively, the reflectivity R of the folding mirror 1009 with respect to the light flux LA is expressed by Expression (6) below.

$$R = \alpha \times R_p + (1 - \alpha) \times R_s \quad (6)$$

For example, when it is assumed that the intensity rate "α" of the light flux LA scanning the minus image height at the time of entering the folding mirror 1009 is 0.70, the reflectivity R of the folding mirror 1009 with respect to the light flux LA scanning the minus image height is obtained from Expression (6) as follows:

$$R = 0.70 \times 75.7\% + 0.30 \times 85.1\% = 78.6\%.$$

Further, when it is assumed that the intensity rate "α" of the light flux LA scanning the plus image height at the time of entering the folding mirror 1009 is 0.60, the reflectivity R of the folding mirror 1009 with respect to the light flux LA scanning the plus image height is obtained from Expression (6) as follows:

$$R = 0.60 \times 75.7\% + 0.40 \times 85.1\% = 79.5\%.$$

Thus, it is understood that, in the first scanned surface 1008, the light amount ratio difference $\Delta R_I$ between image heights as expressed by Expression (7) below is caused between the minus image height and the plus image height due to the reflection on the folding mirror 1009.

$$\Delta R_I = \frac{78.6}{\left(\frac{78.6 + 79.5}{2}\right)} - \frac{79.5}{\left(\frac{78.6 + 79.5}{2}\right)} = -1.1\% \quad (7)$$

Further, the light amount ratio difference $\Delta R_I$ between image heights, which is caused between the minus image height and the plus image height in the first scanned surface 1008 due to reflection on each of the deflecting surface 1005 of the deflecting unit 11 and the folding mirror 1009, can be approximately obtained as expressed by Expression (8) below through use of calculation results of Expression (5) and Expression (7).

$$\Delta R_I = (-1.1\%) + (-1.1\%) = -2.2\% \quad (8)$$

Next, the light flux LB is discussed. An incident angle $\theta_2$ of the light flux LB with respect to the folding mirror 1209 is about 37.4° in both of the case of scanning the minus image height and the case of scanning the plus image height.

Thus, the reflectivities of the folding mirror 1209 with respect to the light flux LB scanning the minus image height and the light flux LB scanning the plus image height are, as shown in FIG. 4, $R_p$=80.3% and $R_s$=86.2%.

Further, for example, when it is assumed that the intensity rate "α" of the light flux LB scanning the minus image height at the time of entering the folding mirror 1209 is 0.95, the reflectivity R of the folding mirror 1209 with respect to the light flux LB scanning the minus image height is obtained from Expression (6) as follows:

$$R = 0.95 \times 80.3\% + 0.05 \times 86.2\% = 80.6\%.$$

In addition, when it is assumed that the intensity rate "α" of the light flux LB scanning the plus image height at the time of entering the folding mirror 1209 is 0.90, the reflectivity R of the folding mirror 1209 with respect to the light flux LB scanning the plus image height is obtained from Expression (6) as follows:

$$R = 0.90 \times 80.3\% + 0.10 \times 86.2\% = 80.9\%.$$

Thus, it is understood that, in the second scanned surface 1208, the light amount ratio difference $\Delta R_I$ between image heights as expressed by Expression (9) below is caused between the minus image height and the plus image height due to the reflection on the folding mirror 1209.

$$\Delta R_I = \frac{80.6}{\left(\frac{80.6 + 80.9}{2}\right)} - \frac{80.9}{\left(\frac{80.6 + 80.9}{2}\right)} = -0.4\% \quad (9)$$

Next, an incident angle $\theta_3$ of the light flux LB with respect to the folding mirror 1210 is about 63.5° in both of a case of scanning the minus image height and a case of scanning the plus image height.

Thus, the reflectivities of the folding mirror 1210 with respect to the light flux LB scanning the minus image height and the light flux LB scanning the plus image height are, as shown in FIG. 4, $R_p$=76.1% and $R_s$=85.1%.

Further, for example, when it is assumed that the intensity rate "α" of the light flux LB scanning the minus image height at the time of entering the folding mirror 1210 is 0.95, the reflectivity R of the folding mirror 1210 with respect to the light flux LB scanning the minus image height is obtained from Expression (6) as follows:

$$R = 0.95 \times 76.1\% + 0.05 \times 85.1\% = 76.5\%.$$

In addition, when it is assumed that the intensity rate "α" of the light flux LB scanning the plus image height at the time of entering the folding mirror 1210 is 0.90, the reflectivity R of the folding mirror 1210 with respect to the light flux LB scanning the plus image height is obtained from Expression (6) as follows:

$$R = 0.90 \times 76.1\% + 0.10 \times 85.1\% = 77.0\%.$$

Thus, it is understood that, in the second scanned surface 1208, the light amount ratio difference $\Delta R_I$ between image heights as expressed by Expression (10) below is caused between the minus image height and the plus image height due to the reflection on the folding mirror 1210.

$$\Delta R_I = \frac{76.5}{\left(\frac{76.5 + 77.0}{2}\right)} - \frac{77.0}{\left(\frac{76.5 + 77.0}{2}\right)} = -0.7\% \quad (10)$$

Further, the light amount ratio difference $\Delta R_I$ between image heights, which is caused between the minus image height and the plus image height in the second scanned surface 1208 due to reflection on each of the deflecting surface 1005 of the deflecting unit 11, the folding mirror 1209, and the folding mirror 1210, can be approximately obtained as expressed by Expression (11) below through use of calculation results of Expression (5), Expression (9), and Expression (10).

$$\Delta R_I = (-1.1\%) + (-0.4\%) + (-0.7\%) = -2.2\% \quad (11)$$

As described above, a light amount difference is caused between the minus image height and the plus image height in each of the first and second scanned surfaces 1008 and 1208, depending on the incident angles of the light fluxes LA and LB with respect to the deflecting surface 1005 and the folding mirrors 1009, 1209, and 1210 and on the polarization states of the light fluxes LA and LB.

Further, when such light amount difference between image heights is caused, in a case in which the light scanning apparatus 10 according to the present embodiment is mounted on an image forming apparatus, density unevenness of a printed image is caused, resulting in reduction in printing performance.

The light amount difference between the image heights as used herein refers to, as described above, a light amount difference between the minus image height and the plus image height, that is, a light amount difference between an upstream edge portion image height and a downstream edge portion image height (both outermost off-axis image heights) in the scanning region. It is to be noted that the light amount difference between the image heights does not refer to a variation amount of the light amount over the entire scanning region.

Figure 5A:
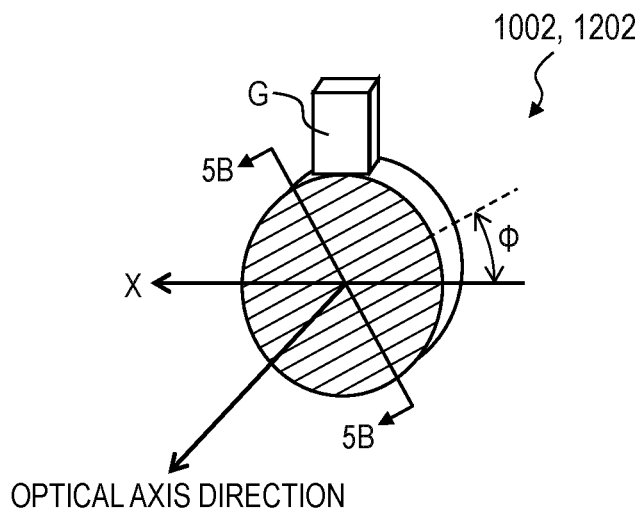
FIG. 5A is a schematic perspective view of a collimator lens included in the light scanning apparatus according to the first embodiment.

FIG. 5A shows a schematic perspective view of each of the first and second collimator lenses 1002 and 1202 provided in the light scanning apparatus 10 according to the present embodiment.

Figure 5B:
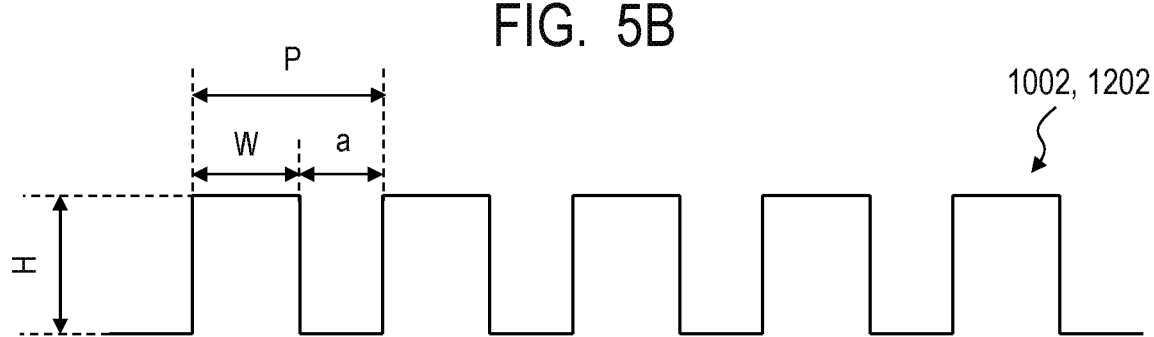
FIG. 5B is a schematic partially-enlarged cross sectional view of the collimator lens included in the light scanning apparatus according to the first embodiment.

Further, FIG. 5B shows a schematic partially-enlarged cross sectional view taken along the line 5B-5B of FIG. 5A.

As illustrated in FIG. 5A and FIG. 5B, in the light scanning apparatus 10 according to the present embodiment, a one-dimensional comb-shaped fine structure is integrally formed on an exit surface of each of the first and second collimator lenses 1002 and 1202.

In FIG. 5A, the diagonal lines on the exit surface of each of the first and second collimator lenses 1002 and 1202 indicate a direction in which protruding portions of the one-dimensional comb shape in this fine structure extend, that is, a structure axis direction.

That is, this structure axis direction is rotated by a structure axis angle Φ with respect to the X direction in a cross section perpendicular to the optical axis.

As illustrated in FIG. 5B, on the exit surface of each of the first and second collimator lenses 1002 and 1202, the one-dimensional comb-shaped fine structure having a height H, a width W, a period P, and a filling width "a" is formed.

In this case, the width W, the period P, and the filling width "a" have a relationship of P=W+a.

That is, as illustrated in FIG. 5A and FIG. 5B, on the exit surface of each of the first and second collimator lenses 1002 and 1202, a plurality of protruding portions extending in the structure axis direction (a first direction, a third direction) in the cross section perpendicular to the optical axis are arrayed so as to be spaced apart from each other in a direction (a second direction, a fourth direction) perpendicular to the structure axis direction.

In one embodiment, the plurality of protruding portions are to be aligned so as to be spaced apart from each other in the direction perpendicular to the structure axis direction.

Further, in the light scanning apparatus 10 according to the present embodiment, a refractive index of the exit surface of each of the first and second collimator lenses 1002 and 1202 is different with respect to a light beam having polarization parallel to the x-direction perpendicular to the structure axis direction (referred to as "TE wave") and a light beam having polarization parallel to the y-direction parallel to the structure axis direction (referred to as "TM wave").

That is, structural birefringence is caused on the exit surface of each of the first and second collimator lenses 1002 and 1202.

Specifically, a refractive index $n_x$ in the x-direction and a refractive index $n_y$ in the y-direction of the exit surface of each of the first and second collimator lenses 1002 and 1202 having the above-mentioned fine structure formed therein are expressed by Expression (12) and Expression (13) below, respectively, when the refractive index of each of the first and second collimator lenses 1002 and 1202 is represented by "n".

$$n_x = \sqrt{\frac{an^2 + (P-a)}{P}} \quad (12)$$

-continued $$n_y = \sqrt{\frac{P}{\frac{a}{n^2} + (P-a)}} \quad (13)$$

Further, a phase lag Δ (a phase difference) of the TM wave with respect to the TE wave, which is caused by passing through the exit surface of each of the first and second collimator lenses 1002 and 1202 having the above-mentioned fine structure formed therein, is expressed by Expression (14) below.

$$\Delta = (n_x - n_y) \times H \quad (14)$$

In each of the first and second collimator lenses 1002 and 1202 provided in the light scanning apparatus 10 according to the present embodiment, a one-dimensional comb-shaped fine structure having a height H, a period P, and a filling width "a" of 500 nm, 688 nm, and 300 nm, respectively, is formed.

Further, the first and second collimator lenses 1002 and 1202 are each made of a material of ZEONEX (trademark) K22R, and hence the refractive index "n" is 1.52819 (wavelength λ=790 nm).

When those values are substituted into Expression (12) to Expression (14), $n_x$, $n_y$, and Δ are obtained as 1.32404, 1.21489, and 54.6 nm, respectively.

Further, a value obtained by dividing the phase lag Δ by the wavelength λ=790 nm of each of the light fluxes LA and LB becomes Δ/λ=54.6 nm/790 nm≈1/14.5, and hence the fine structure formed on the exit surface of each of the first and second collimator lenses 1002 and 1202 has an effect equivalent to that of a λ/14.5 plate.

It is known that, when light having linear polarization is incident on a λ/4 plate arranged at an appropriate angle, the light having circular polarization exits from the λ/4 plate, but when light having linear polarization is incident on the λ/14.5 plate, the light having elliptical polarization exits from the λ/14.5 plate.

Further, changing of the structure axis angle Φ of the λ/14.5 plate allows an orientation or flatness of the elliptical polarization of the light exiting from the λ/14.5 plate to be adjusted to some extent.

In this case, considering an i-direction parallel to the x-direction and a j-direction perpendicular to the x-direction in a plane perpendicular to the optical axis, changes in polarization states of the light fluxes LA and LB after passing through the respective first and second collimator lenses 1002 and 1202 are described through use of a Jones matrix in the i-direction and the j-direction.

Specifically, when a polarization angle which is a rotational angle from the i-direction in an ij cross section of polarization of each of the light fluxes LA and LB emitted from the first and second light sources 1001 and 1201 is represented by "φ", a polarization vector $\vec{E}_{in}$ of each of the light fluxes LA and LB at the time of entering the first and second collimator lenses 1002 and 1202 is expressed by Expression (15) below.

$$\vec{E}_{in} = A \begin{pmatrix} \cos \varphi \\ \sin \varphi \end{pmatrix} \quad (15)$$

In Expression (15), A represents a predetermined amplitude.

Next, a matrix T representing an action to the polarization states of the light fluxes LA and LB caused by the first and second collimator lenses 1002 and 1202 each having a fine structure formed on its exit surface is expressed by Expression (16) below.

$$T = \begin{pmatrix} 1 & 0 \\ 0 & e^{-i\Delta} \end{pmatrix} \quad (16)$$

Thus, a polarization vector $\vec{E}_{out}$ of each of the light fluxes LA and LB after passing through the first and second collimator lenses 1002 and 1202 is expressed by Expression (17) below.

$$\vec{E}_{out} = R(-\Phi)TR(\Phi)\vec{E}_{in} = \quad (17)$$
$$A \begin{pmatrix} \cos \Phi & \sin \Phi \\ -\sin \Phi & \cos \Phi \end{pmatrix} \begin{pmatrix} 1 & 0 \\ 0 & e^{-i\Delta} \end{pmatrix} \begin{pmatrix} \cos \Phi & -\sin \Phi \\ \sin \Phi & \Phi \cos \end{pmatrix} \begin{pmatrix} \cos \varphi \\ \sin \varphi \end{pmatrix}$$

In Expression (17), R(Φ) represents a rotation matrix of the structure axis angle Φ.

As expressed by Expression (17), it is understood that the polarization states of the light fluxes LA and LB after passing through the first and second collimator lenses 1002 and 1202 change depending on the polarization angle "φ", the structure axis angle φ, and the phase lag Δ.

From the facts described above, in the light scanning apparatus 10 according to the present embodiment, the change of the polarization state of the light flux LA to be caused by the first collimator lens 1002 is appropriately set so that the intensity rates "α" at the time of entering the folding mirror 1009 of the light flux LA scanning the minus image height and the light flux LA scanning the plus image height in the above-mentioned discussion become opposite to each other.

Similarly, the change of the polarization state of the light flux LB to be caused by the second collimator lens 1202 is appropriately set so that the intensity rates "α" at the time of entering the folding mirrors 1209 and 1210 of the light flux LB scanning the minus image height and the light flux LB scanning the plus image height in the above-mentioned discussion become opposite to each other.

Specifically, as for the light flux LA, when it is assumed that the intensity rate "α" of the light flux LA scanning the minus image height at the time of entering the folding mirror 1009 is 0.60, the reflectivity R of the folding mirror 1009 with respect to the light flux LA scanning the minus image height is obtained from Expression (6) as follows:

$$R = 0.60 \times 75.7\% + 0.40 \times 85.1\% = 79.5\%.$$

Further, when it is assumed that the intensity rate "α" of the light flux LA scanning the plus image height at the time of entering the folding mirror 1009 is 0.70, the reflectivity R of the folding mirror 1009 with respect to the light flux LA scanning the plus image height is obtained from Expression (6) as follows:

$$R = 0.70 \times 75.7\% + 0.30 \times 85.1\% = 78.6\%.$$

Thus, in the first scanned surface 1008, the light amount ratio difference $\Delta R_I$ between image heights as expressed by Expression (7A) below in place of the above-mentioned Expression (7) is caused between the minus image height and the plus image height due to the reflection on the folding mirror 1009.

$$\Delta R_I = \frac{79.5}{\left(\frac{79.5+78.6}{2}\right)} - \frac{78.6}{\left(\frac{79.5+78.6}{2}\right)} = 1.1\% \quad (7A)$$

Further, the light amount ratio difference $\Delta R_I$ between image heights, which is caused between the minus image height and the plus image height in the first scanned surface 1008 due to reflection on each of the deflecting surface 1005 of the deflecting unit 11 and the folding mirror 1009, can be obtained as expressed by Expression (8A) below from Expression (5) and Expression (7A).

$$\Delta R_I = (-1.1\%) + 1.1\% = 0.0\% \quad (8A)$$

In addition, as for the light flux LB, when it is assumed that the intensity rate "α" of the light flux LB scanning the minus image height at the time of entering the folding mirror 1209 is 0.90, the reflectivity R of the folding mirror 1209 with respect to the light flux LB scanning the minus image height is obtained from Expression (6) as follows:

$$R = 0.90 \times 80.3\% + 0.10 \times 86.2\% = 80.9\%.$$

Further, when it is assumed that the intensity rate "α" of the light flux LB scanning the plus image height at the time of entering the folding mirror 1209 is 0.95, the reflectivity R of the folding mirror 1209 with respect to the light flux LB scanning the plus image height is obtained from Expression (6) as follows:

$$R = 0.95 \times 80.3\% + 0.05 \times 86.2\% = 80.6\%.$$

Thus, in the second scanned surface 1208, the light amount ratio difference $\Delta R_I$ between image heights as expressed by Expression (9A) below in place of the above-mentioned Expression (9) is caused between the minus image height and the plus image height due to the reflection on the folding mirror 1209.

$$\Delta R_I = \frac{80.9}{\left(\frac{80.9+80.6}{2}\right)} - \frac{80.6}{\left(\frac{80.9+80.6}{2}\right)} = 0.4\% \quad (9A)$$

Further, when it is assumed that the intensity rate "α" of the light flux LB scanning the minus image height at the time of entering the folding mirror 1210 is 0.90, the reflectivity R of the folding mirror 1210 with respect to the light flux LB scanning the minus image height is obtained from Expression (6) as follows:

$$R = 0.90 \times 76.1\% + 0.10 \times 85.1\% = 77.0\%.$$

In addition, when it is assumed that the intensity rate "α" of the light flux LB scanning the plus image height at the time of entering the folding mirror 1210 is 0.95, the reflectivity R of the folding mirror 1210 with respect to the light flux LB scanning the plus image height is obtained from Expression (6) as follows:

$$R = 0.95 \times 76.1\% + 0.05 \times 85.1\% = 76.5\%.$$

Thus, in the second scanned surface 1208, the light amount ratio difference $\Delta R_I$ between image heights as expressed by Expression (10A) below in place of the above-mentioned Expression (10) is caused between the minus image height and the plus image height due to the reflection on the folding mirror 1210.

$$\Delta R_I = \frac{77.0}{\left(\frac{77.0+76.5}{2}\right)} - \frac{76.5}{\left(\frac{77.0+76.5}{2}\right)} = 0.7\% \quad (10A)$$

Further, the light amount ratio difference $\Delta R_I$ between image heights, which is caused between the minus image height and the plus image height in the second scanned surface 1208 due to reflection on each of the deflecting surface 1005 of the deflecting unit 11, the folding mirror 1209, and the folding mirror 1210, can be obtained as expressed by Expression (11A) below from Expression (5), Expression (9A), and Expression (10A).

$$\Delta R_I = (-1.1\%) + 0.4\% + 0.7\% = 0.0\% \quad (11A)$$

As described above, in the light scanning apparatus 10 according to the present embodiment, the fine structure is formed on the exit surface of each of the first and second collimator lenses 1002 and 1202 so that the polarization state of each of the light fluxes LA and LB is changed. In this manner, the light amount difference between the image heights in each of the first and second scanned surfaces 1008 and 1208 can be reduced.

When the polarization state of each of the light fluxes LA and LB is changed through use of the fine structure as described above, the light amount ratio difference $\Delta R_I$ between the image heights expressed by Expression (5), which is caused by the reflection on the deflecting surface 1005 of the deflecting unit 11, also changes in a strict sense.

However, even when the fine structure is formed on the exit surface of each of the first and second collimator lenses 1002 and 1202, each of the light fluxes LA and LB at the time of entering the deflecting unit 11 still substantially has P polarization.

In addition, the light amount ratio difference $\Delta R_I$ between the image heights expressed by Expression (5) is mainly caused by an incident angle difference between the light flux LA or LB scanning the minus image height and the light flux LA or LB scanning the plus image height, and hence it is assumed that this light amount ratio difference $\Delta R_I$ between the image heights does not change in the above-mentioned discussion.

Typically, the light amount difference between the image heights is about 10% of the light amount of the light flux at most. In order to reduce such light amount difference between image heights, it is sufficient that the fine structure to be formed have a function of a λ/6 plate to a λ/20 plate.

In other words, in the light scanning apparatus 10 according to the present embodiment, when a phase difference between the structure axis direction and the direction perpendicular to the structure axis direction of the birefringence caused by the formed fine structure is represented by Δ and a wavelength of the light flux is represented by "λ", it suffices that Conditional Expression (18) below be satisfied.

$$\frac{1}{20} \le \frac{\Delta}{\lambda} \le \frac{1}{6} \quad (18)$$

When the formed fine structure has a function of a wavelength plate larger than λ/6, the light amount difference between the image heights can be reduced, but a sensitivity to an arrangement error of the structure axis angle Φ is disadvantageously increased.

Meanwhile, when the formed fine structure has a function of a wavelength plate smaller than λ/20, the reduction of the light amount difference between the image heights becomes disadvantageously insufficient.

In the light scanning apparatus 10 according to the present embodiment, the Conditional Expression (18a) below is to be satisfied in place of Conditional Expression (18).

$$\frac{1}{18} \le \frac{\Delta}{\lambda} \le \frac{1}{8} \quad (18a)$$

In the light scanning apparatus 10 according to the present embodiment, the Conditional Expression (18b) below is to be satisfied in place of Conditional Expression (18a).

$$\frac{1}{16} \le \frac{\Delta}{\lambda} \le \frac{1}{10} \quad (18b)$$

Next, results of measurement in a verifying apparatus 10A that has been performed to verify effects obtained by the above-mentioned light scanning apparatus 10 according to this embodiment are described.

Figure 6A:
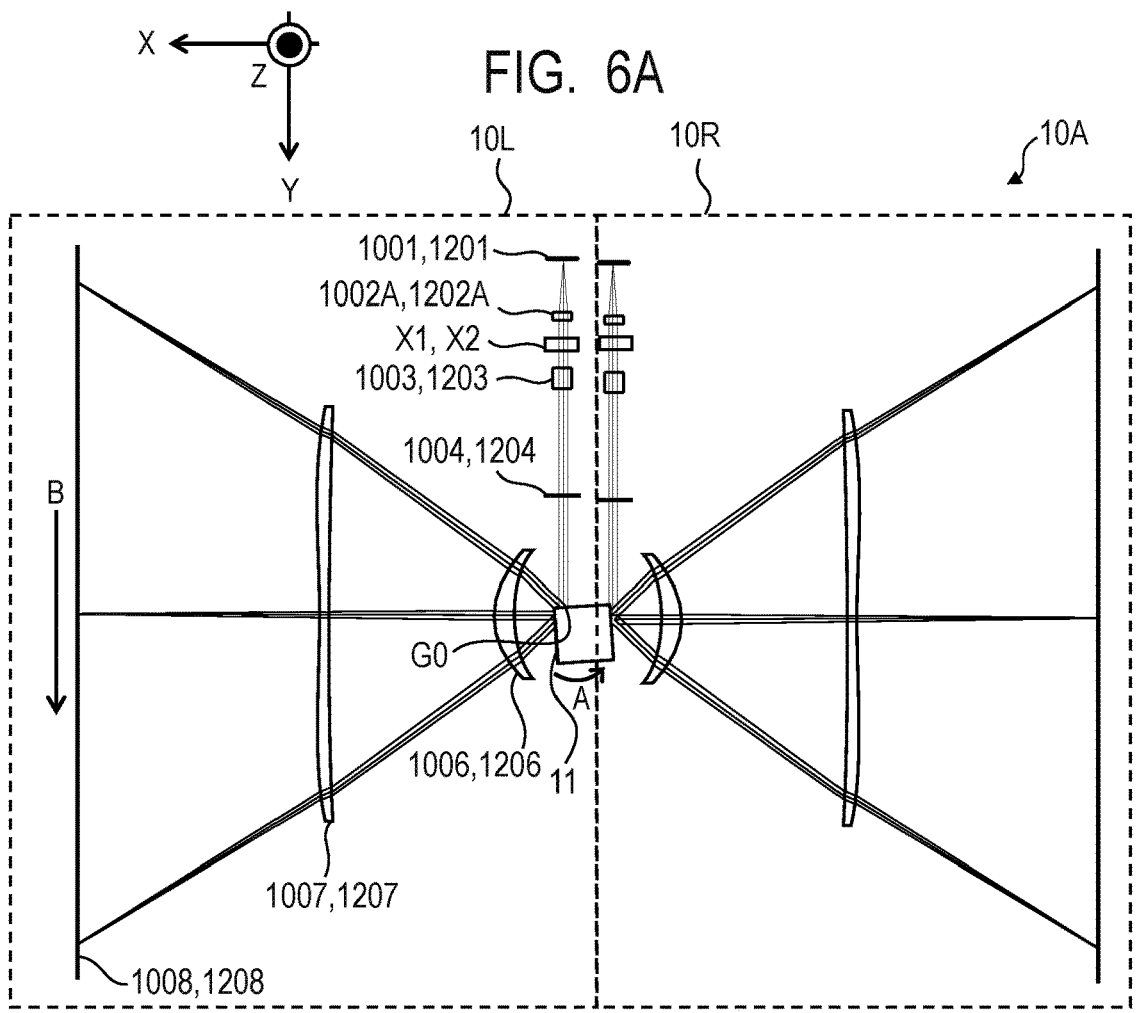
FIG. 6A is a developed view in a main scanning cross section of a verifying apparatus.

FIG. 6A shows a developed view in the main scanning cross section of the verifying apparatus 10A.

Figure 6B:
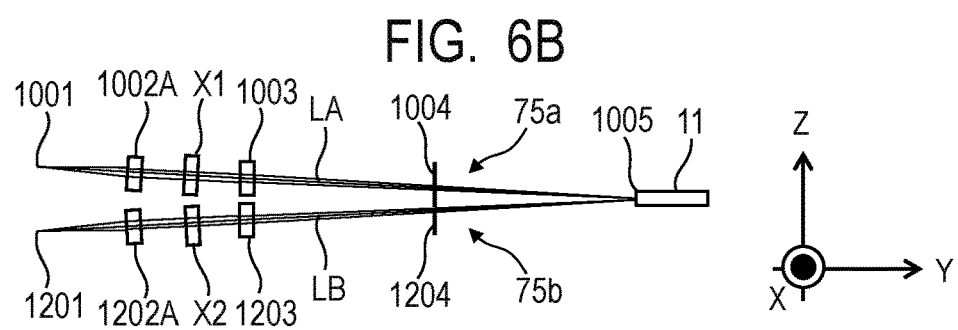
FIG. 6B is a partial developed view in a sub-scanning cross section of the verifying apparatus.
Figure 6C:
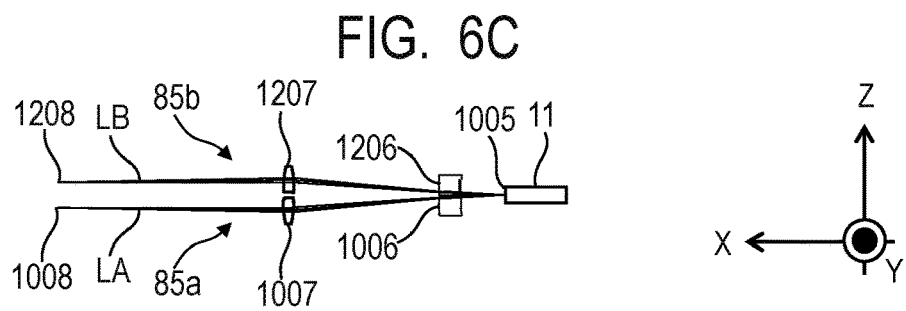
FIG. 6C is a partial developed view in the sub-scanning cross section of the verifying apparatus.

FIG. 6B and FIG. 6C show developed views in the sub-scanning cross section of incident optical systems and scanning optical systems, respectively, which are included in the verifying apparatus 10A.

The verifying apparatus 10A has the same configuration as that of the light scanning apparatus 10 according to the present embodiment except that first and second collimator lenses 1002A and 1202A are provided in place of the first and second collimator lenses 1002 and 1202, and first and second optical elements X1 and X2 are newly provided.

Accordingly, the same members as those of the light scanning apparatus 10 according to the present embodiment are denoted by the same reference symbols in the verifying apparatus 10A, and description thereof is omitted.

Specifically, the configuration of the verifying apparatus 10A is different from that of the light scanning apparatus 10 according to the present embodiment in the following points.

First, the above-mentioned fine structure is not formed in each of the first and second collimator lenses 1002A and 1202A.

In addition, the first optical element X1 which is a λ/13.2 plate is arranged between the first collimator lens 1002A and the first cylindrical lens 1003.

Further, the second optical element X2 which is a λ/13.2 plate is arranged between the second collimator lens 1202A and the second cylindrical lens 1203.

In this manner, in the verifying apparatus 10A, when the light flux LA passes through the first collimator lens 1002A and the first optical element X1, an action substantially equivalent to that of the phase lag Δ=λ/14.5 in the light scanning apparatus 10 according to the present embodiment can be applied to the light flux LA.

Further, when the light flux LB passes through the second collimator lens 1202A and the second optical element X2, an action substantially equivalent to that of the phase lag Δ=λ/14.5 in the light scanning apparatus 10 according to the present embodiment can be applied to the light flux LB.

Further, in the verifying apparatus 10A, fast axes of the respective first and second optical elements X1 and X2 are rotated in a cross section perpendicular to the optical axis so as to correspond to the rotations of the structure axis angles Φ of the respective first and second collimator lenses 1002 and 1202 in the light scanning apparatus 10 according to the present embodiment. Under this state, the light amounts on the first and second scanned surfaces 1008 and 1208 are measured.

Further, in the verifying apparatus 10A, the incident angle $\theta_1$ of the light flux LA with respect to the folding mirror 1009 is different from that of the light scanning apparatus 10 according to the present embodiment.

Specifically, in the light scanning apparatus 10 according to the present embodiment, the incident angle $\theta_1$ with respect to the folding mirror 1009 of the light flux LA scanning the on-axis image height of the first scanned surface 1008 is 50.4°. In contrast, this incident angle $\theta_1$ in the verifying apparatus 10A is 33.4°.

Further, in the verifying apparatus 10A, the incident angles $\theta_2$ and $\theta_3$ of the light flux LB with respect to the folding mirrors 1209 and 1210 are different from those of the light scanning apparatus 10 according to the present embodiment.

Specifically, in the light scanning apparatus 10 according to the present embodiment, the incident angles $\theta_2$ and $\theta_3$ with respect to the folding mirrors 1209 and 1210 of the light flux LB scanning the on-axis image height of the second scanned surface 1208 are 11.8° and 56.2°, respectively. In contrast, the incident angles $\theta_2$ and $\theta_3$ in the verifying apparatus 10A are 12.3° and 50.2°, respectively.

Further, in the verifying apparatus 10A, the shapes of the first fθ lens 1006 and the second fθ lens 1007 are slightly different from those of the light scanning apparatus 10 according to the present embodiment.

In addition, in the light scanning apparatus 10 according to the present embodiment, the second fθ lens 1007 is arranged so that a distance d16 on the optical path of the light flux LA between the exit surface of the second fθ lens 1007 and the first scanned surface 1008 becomes 68.50 mm. In contrast, in the verifying apparatus 10A, the second fθ lens 1007 is arranged so that this distance d16 becomes 84.50 mm.

However, it is known that such differences in shape and arrangement of the first fθ lens 1006 and the second fθ lens 1007 in the verifying apparatus 10A hardly affect the light amount difference between the image heights.

Meanwhile, in the verifying apparatus 10A, as the first fθ lens 1206 and the second fθ lens 1207, the same fθ lenses as those in the light scanning apparatus 10 according to the present embodiment are used.

Figure 7A:
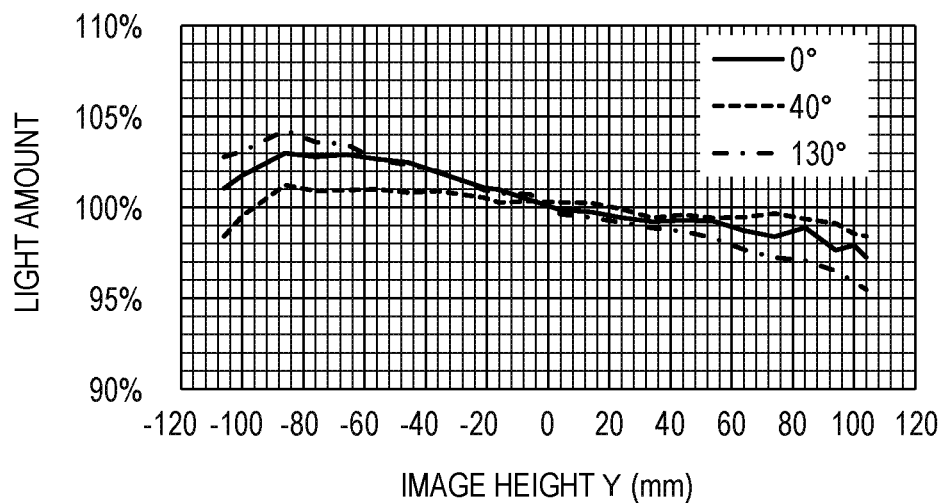
FIG. 7A is a graph for showing measurement results of a light amount at each image height on a scanned surface obtained by the verifying apparatus.
Figure 7B:
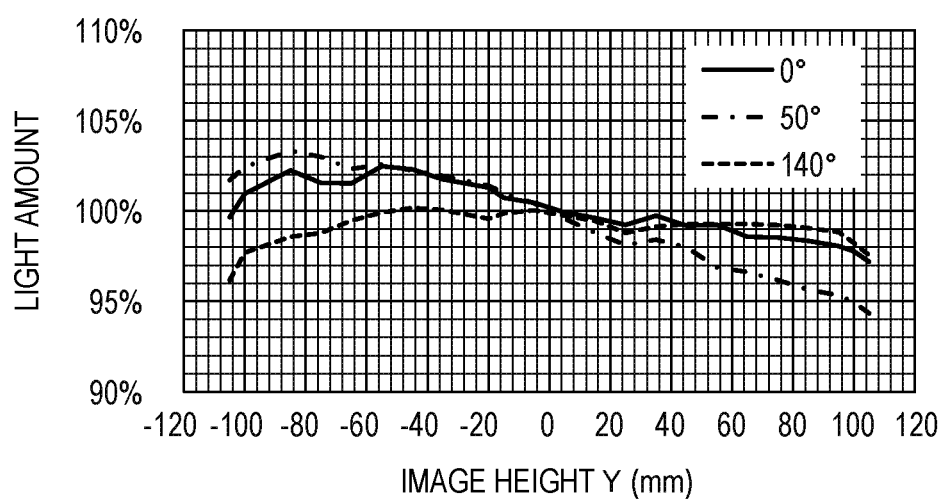
FIG. 7B is a graph for showing measurement results of a light amount at each image height on a scanned surface obtained by the verifying apparatus.

FIG. 7A and FIG. 7B show measurement results of the light amount at each image height Y on the respective first and second scanned surfaces 1008 and 1208, which have been obtained by the verifying apparatus 10A.

In FIG. 7A and FIG. 7B, the light amount at each image height Y is normalized by the light amount at the image height Y=0 mm.

Specifically, FIG. 7A shows results obtained when an angle Φ (corresponding to the structure axis angle Φ of the fine structure) formed by the fast axis of the first optical element X1 with respect to the X direction in the cross section perpendicular to the optical axis is set to 0°, 40°, and 130°.

In this case, the angles Φ=0°, 40°, and 130° correspond to an angle equivalent to the configuration in which no fine structure is provided, an angle with which a small light amount difference between image heights has been measured, and an angle with which a large light amount difference between image heights has been measured, respectively.

In addition, when an image height Y=−100 mm and an image height Y=100 mm are assumed to be the minus image height and the plus image height, respectively, it is understood from FIG. 7A that the light amount difference between the image heights in the first scanned surface 1008 obtained by the verifying apparatus 10A is 3.8%, 1.0%, and 7.2% at the angles Φ=0°, 40°, and 130°, respectively.

Thus, it is understood that, in the verifying apparatus 10A, when the first optical element X1 is rotated, the light amount difference between the image heights in the first scanned surface 1008 can be changed in a range between 1.0% and 7.2%, and the light amount difference between the image heights in the first scanned surface 1008 can be sufficiently reduced particularly at the angle Φ=40°.

Further, FIG. 7B shows results obtained when an angle Φ (corresponding to the structure axis angle Φ of the fine structure) formed by the fast axis of the second optical element X2 with respect to the X direction in the cross section perpendicular to the optical axis is set to 0°, 50°, and 140°.

In this case, the angles Φ=0°, 50°, and 140° Correspond to the angle equivalent to the configuration in which no fine structure is provided, an angle with which a large light amount difference between image heights has been measured, and an angle with which a small light amount difference between image heights has been measured, respectively.

In addition, when the image height Y=−100 mm and the image height Y=100 mm are assumed to be the minus image height and the plus image height, respectively, it is understood from FIG. 7B that the light amount difference between the image heights in the second scanned surface 1208 obtained by the verifying apparatus 10A is 3.2%, 7.2%, and −0.5% at the angles Φ=0°, 50°, and 140°, respectively.

Thus, it is understood that, in the verifying apparatus 10A, when the second optical element X2 is rotated, the light amount difference between the image heights in the second scanned surface 1208 can be changed in a range between −0.5% and 7.2%, and the light amount difference between the image heights in the second scanned surface 1208 can be sufficiently reduced particularly at the angle Φ=140°.

It is to be understood that the above-mentioned results are actually measured values obtained by the verifying apparatus 10A, and thus include measurement errors such as product variations and noise.

Further, in the verifying apparatus 10A, the variation amounts of the light amount difference between the image heights in the respective first and second scanned surfaces 1008 and 1208 described above are equivalent to each other.

Further, the difference in configuration between the verifying apparatus 10A and the light scanning apparatus 10 according to the present embodiment is smaller than the difference in the verifying apparatus 10A between the configuration of the first incident optical system 75a and the first scanning optical system 85a for the light flux LA and the configuration of the second incident optical system 75b and the second scanning optical system 85b for the light flux LB.

From the above, it can be interpreted that the above-mentioned measurement results obtained by the verifying apparatus 10A sufficiently show the effects in the light scanning apparatus 10 according to the present embodiment.

That is, in the light scanning apparatus 10 according to the present embodiment, when the structure axis angles Φ of the fine structures formed in the respective first and second collimator lenses 1002 and 1202 are set to 40° and 140°, an effect of sufficiently reducing the light amount difference between the image heights in the first and second scanned surfaces 1008 and 1208 can be obtained.

As in the light scanning apparatus 10 according to the present embodiment, even when a fine structure having a simpler composition and a smaller height H as compared to the related-art fine structure is used, the effect of sufficiently reducing the light amount difference between the image heights in the scanned surface can be obtained.

In this manner, the fine structure can be integrally formed with the same material as that of each of the first and second collimator lenses 1002 and 1202, and hence an effect of manufacturing the first and second collimator lenses 1002 and 1202 having the fine structures formed therein at low cost can also be obtained.

When a plurality of scanned surfaces, for example, the first and second scanned surfaces 1008 and 1208 are scanned as in the light scanning apparatus 10 according to the present embodiment, the structure axis angles Φ of the fine structures in the respective first and second collimator lenses 1002 and 1202 set to reduce the light amount difference between the image heights in the respective first and second scanned surfaces 1008 and 1208 are typically different from each other.

At this time, considering from the measurement results obtained by the above-mentioned verifying apparatus 10A, when a difference between the structure axis angles Φ of the respective fine structures set to reduce the light amount difference between the image heights is substantially less than 10°, the structure axis angles Φ of the respective fine structures can be set to be the same as each other.

Meanwhile, when this difference is 10° or more, in one embodiment, the structure axis angles Φ of the respective fine structures is respectively set to appropriate amounts in order to reduce the light amount difference between the image heights.

Further, several methods are conceivable to set the structure axis angles Φ of the respective plurality of fine structures.

Figure 8A:
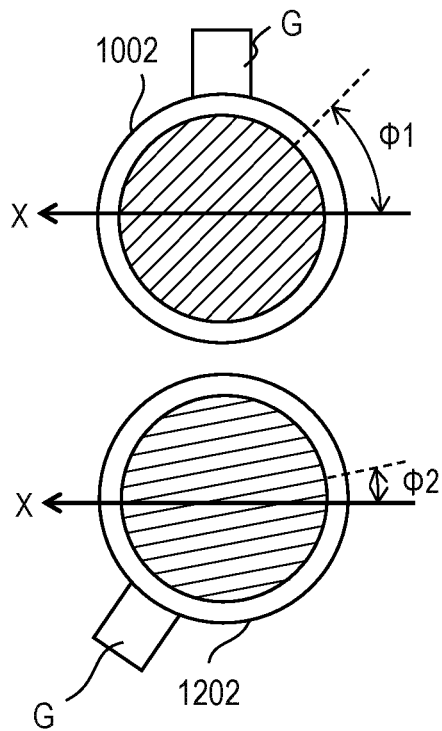
FIG. 8A is a schematic front view for illustrating a method of setting a structure axis angle of a fine structure.
Figure 8B:
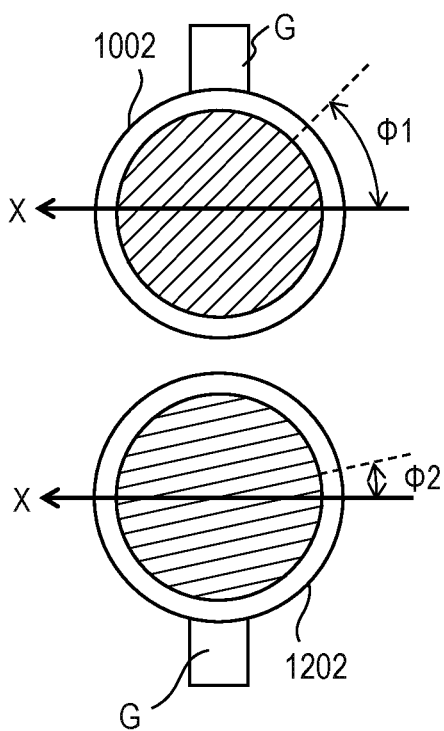
FIG. 8B is a schematic front view for illustrating a method of setting the structure axis angle of the fine structure.
Figure 8C:
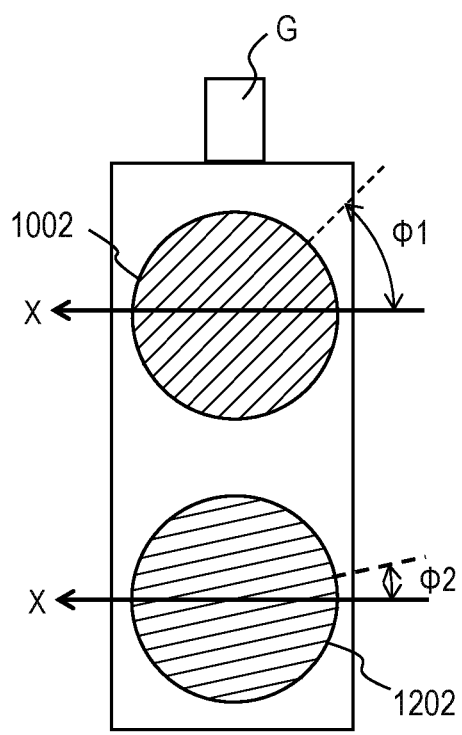
FIG. 8C is a schematic front view for illustrating a method of setting the structure axis angle of the fine structure.

FIG. 8A, FIG. 8B, and FIG. 8C show schematic front views for illustrating methods of setting a structure axis angle $\Phi 1$ of the fine structure (a first fine structure) formed in the first collimator lens 1002 and a structure axis angle $\Phi 2$ of the fine structure (a second fine structure) formed in the second collimator lens 1202, as viewed from a direction parallel to the optical axis.

For example, as illustrated in FIG. 8A, it is conceivable to adopt a method of using, as the first and second collimator lenses 1002 and 1202, optical elements having the same shape as each other and arranging the first and second collimator lenses 1002 and 1202 so that the structure axis angles thereof are different from each other.

In this case, the same optical element can be used as each of the first and second collimator lenses 1002 and 1202, and hence there is an advantage in that the manufacture of the first and second collimator lenses 1002 and 1202 is facilitated.

Meanwhile, it is required to form an optical surface of each of the first and second collimator lenses 1002 and 1202 into an axial-symmetry shape and to set a position reference G of each of the first and second collimator lenses 1002 and 1202 in the light scanning apparatus 10 according to the present embodiment.

The optical elements having the same shape as each other as used herein may have base surfaces of the same shape but different fine structures formed on those base surfaces.

Further, the optical elements having the same shape as each other as used herein may have the same shape in effective regions contributing to imaging, but have different shapes in non-effective regions not contributing to imaging.

Further, as illustrated in FIG. 8B, it is conceivable to adopt a method of using and arranging, as the first and second collimator lenses 1002 and 1202, optical elements different from each other, in which the fine structures are formed so that the structure axis directions with respect to the position reference G are different from each other.

In this case, the optical elements different from each other are used as the first and second collimator lenses 1002 and 1202, and hence there is a disadvantage in that the manufacture of the first and second collimator lenses 1002 and 1202 is complicated.

Meanwhile, it is not required to form the optical surface of each of the first and second collimator lenses 1002 and 1202 into an axial-symmetry shape, and there is an advantage in that the position reference G of each of the first and second collimator lenses 1002 and 1202 in the light scanning apparatus 10 according to the present embodiment can be easily set common to each other.

In the light scanning apparatus 10 according to the present embodiment, this method illustrated in FIG. 8B is adopted.

Further, as a method of forming the fine structures so that the structure axis directions thereof with respect to the position reference G are different from each other in the respective first and second collimator lenses 1002 and 1202, it is also conceivable to adopt a method of integrally manufacturing the first and second collimator lenses 1002 and 1202 as illustrated in FIG. 8C.

When the first and second collimator lenses 1002 and 1202 are formed integrally with each other through use of such compound-eye lens, there is an advantage in that the first and second collimator lenses 1002 and 1202 can be manufactured at low cost.

Meanwhile, there is a disadvantage in that a mutual position between the first and second collimator lenses 1002 and 1202 in the compound-eye lens is fixed.

In the light scanning apparatus 10 according to the present embodiment, each of the light fluxes LA and LB emitted from the first and second light sources 1001 and 1201 has linear polarization.

Further, an angle between the polarization direction of each of the light fluxes LA and LB at the time of entering the first and second collimator lenses 1002 and 1202 and the structure axis direction of the fine structure formed in each of the first and second collimator lenses 1002 and 1202 is 10° or more.

In this manner, even when the height H of this fine structure is small, an effect of easily causing the change in the polarization state of each of the light fluxes LA and LB by the structural birefringence is obtained.

However, the present embodiment is not limited thereto. Even when the light fluxes LA and LB having polarization states with, in addition to a polarized light component in a predetermined direction, a polarized light component in a direction perpendicular to the predetermined direction to some extent, that is, with no linear polarization are caused to be emitted from the first and second light sources 1001 and 1201, the effect of the present embodiment can be obtained.

Further, even when the angle between the polarization direction of each of the light fluxes LA and LB at the time of entering the first and second collimator lenses 1002 and 1202 and the structure axis direction of the fine structure formed in each of the first and second collimator lenses 1002 and 1202 is smaller than 10°, the effect of the present embodiment can be obtained.

In the light scanning apparatus 10 according to the present embodiment, as described above, the folding mirror 1009 is provided on the optical path of the light flux LA between the deflecting unit 11 and the first scanned surface 1008, and the folding mirrors 1209 and 1210 are provided on the optical path of the light flux LB between the deflecting unit 11 and the second scanned surface 1208.

In this manner, the difference between the reflectivity with respect to P-polarized light and the reflectivity with respect to S-polarized light of each of the folding mirrors 1009, 1209, and 1210 is greatly utilized so that the light amount difference between the image heights in each of the first and second scanned surfaces 1008 and 1208 is reduced.

However, the present embodiment is not limited thereto. When a difference between the reflectivity with respect to P-polarized light and the reflectivity with respect to S-polarized light of the deflecting unit 11 or a difference between a transmittance with respect to P-polarized light and a transmittance with respect to S-polarized light of each of the first fθ lenses 1006 and 1206 and the second fθ lenses 1007 and 1207 is utilized, even in a configuration in which no folding mirror is provided, the light amount difference between the image heights can be reduced.

In the light scanning apparatus 10 according to the present embodiment, the wavelength of each of the light fluxes LA and LB emitted from the first and second light sources 1001 and 1201 is over 700 nm.

Thus, it is required to increase the height H of the fine structure in order to cause the same phase lag Δ as that of visible light having a wavelength of 550 nm.

That is, the light scanning apparatus 10 according to the present embodiment proposes a method of reducing the light amount difference between the image heights in the first and second scanned surfaces 1008 and 1208 through use of a fine structure that is useful for such long wavelength and can be easily manufactured.

In the light scanning apparatus 10 according to the present embodiment, the first and second collimator lenses 1002 and 1202 having the fine structures formed therein are manufactured by injection molding. Thus, cost of the manufacture is reduced.

However, the present embodiment is not limited thereto. The effect of the present embodiment can be obtained even when the first and second collimator lenses 1002 and 1202 having the fine structures formed therein are manufactured by another molding method such as press molding.

In the light scanning apparatus 10 according to the present embodiment, the fine structure is formed on the exit surface of each of the first and second collimator lenses 1002 and 1202, but the present embodiment is not limited thereto.

That is, the fine structure may be formed on both of the incident surface and the exit surface of each of the first and second collimator lenses 1002 and 1202.

Further, the fine structure may be formed on the exit surface of each of the first and second collimator lenses 1002 and 1202, and the fine structure may be further formed on one surface of each of the first and second cylindrical lenses 1003 and 1203.

That is, the fine structure is formed on at least one optical surface of at least one optical element provided in each of the first and second incident optical systems 75a and 75b. In this manner, the effect of the present embodiment can be obtained.

In the light scanning apparatus 10 according to the present embodiment, the fine structure is formed on the exit surface of each of the first and second collimator lenses 1002 and 1202 having an axial-symmetry shape, but the present embodiment is not limited thereto. The fine structure may be formed on an optical surface of a predetermined optical element not having an axial-symmetry shape.

In the light scanning apparatus 10 according to the present embodiment, the fine structure is provided on both of the first and second collimator lenses 1002 and 1202, but the present embodiment is not limited thereto.

That is, when the light amount difference between the image heights is sufficiently reduced in a predetermined scanned surface, no fine structure is provided in an incident optical system corresponding to the light flux guided to the predetermined scanned surface. In this manner, the configuration of the light scanning apparatus 10 according to the present embodiment can be simplified.

In the light scanning apparatus 10 according to the present embodiment, the first and second collimator lenses 1002 and 1202 having the fine structures formed therein are manufactured through use of a resin material, but the present embodiment is not limited thereto. The first and second collimator lenses 1002 and 1202 having the fine structures formed therein may be manufactured through use of other materials such as glass.

In the light scanning apparatus 10 according to the present embodiment, the polarization direction of each of the light fluxes LA and LB at the time of entering the deflecting unit 11 and the deflecting surface 1005 of the deflecting unit 11 are parallel to each other, but the present embodiment is not limited thereto.

Further, in the light scanning apparatus 10 according to the present embodiment, each of the light fluxes LA and LB is obliquely incident on the deflecting surface 1005 of the deflecting unit 11 in each of the main scanning cross section and the sub-scanning cross section, but the present embodiment is not limited thereto.

In the light scanning apparatus 10 according to the present embodiment, the deflecting unit 11 having a reflectivity characteristic as shown in FIG. 2 and the folding mirrors 1009, 1209, and 1210 each having a reflectivity characteristic as shown in FIG. 4 are used, but the present embodiment is not limited thereto.

In general, in the reflectivity characteristic of each of the deflecting unit 11 and the folding mirrors 1009, 1209, and 1210, as the change of the reflectivity with respect to the incident angle or the difference in reflectivity between P-polarized light and S-polarized light becomes larger, the light amount difference between the image heights in each of the first and second scanned surfaces 1008 and 1208 is more caused, and the light amount difference between the image heights is reduced more easily by the above-mentioned fine structure.

However, when such a change of the reflectivity with respect to the incident angle or a difference in reflectivity between P-polarized light and S-polarized light becomes excessively larger, in some cases, it becomes difficult to sufficiently reduce the light amount difference between the image heights in each of the first and second scanned surfaces 1008 and 1208 by the above-mentioned fine structure.

Second Embodiment

Figure 9A:
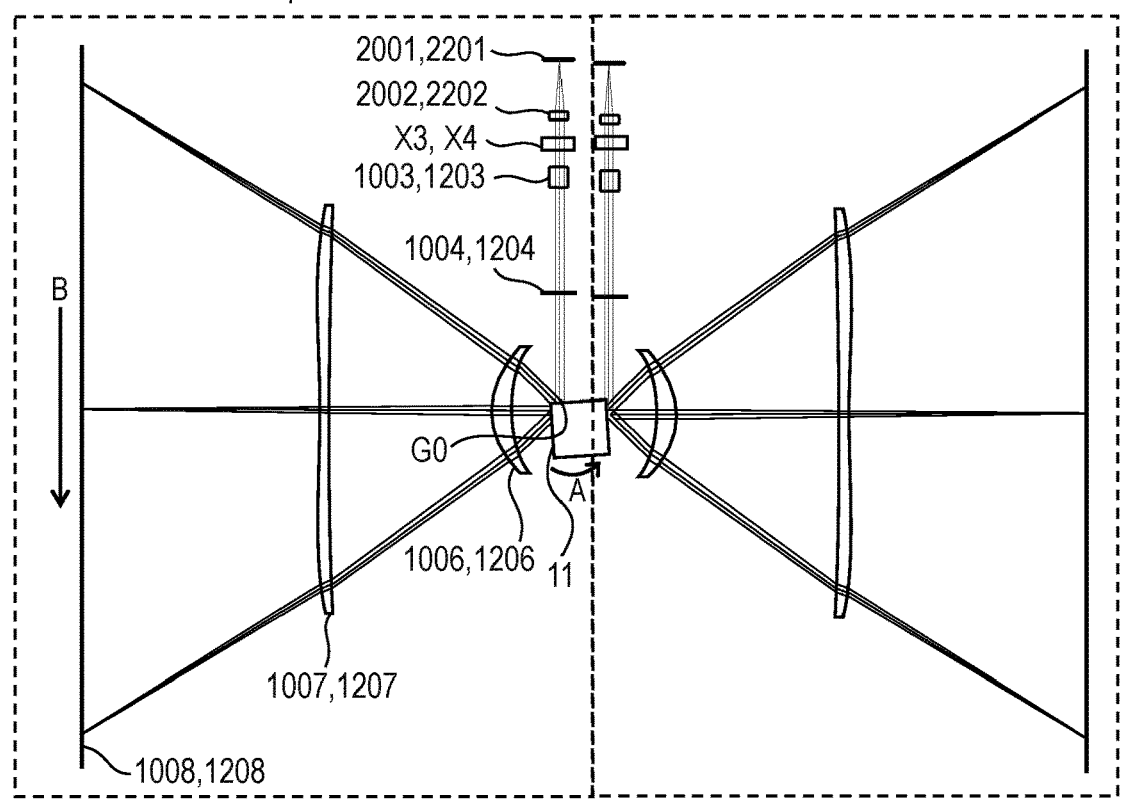
FIG. 9A is a developed view in a main scanning cross section of a light scanning apparatus according to a second embodiment of the present invention.

FIG. 9A shows a developed view in the main scanning cross section of a light scanning apparatus 20 according to a second embodiment of the present invention.

Figure 9B:
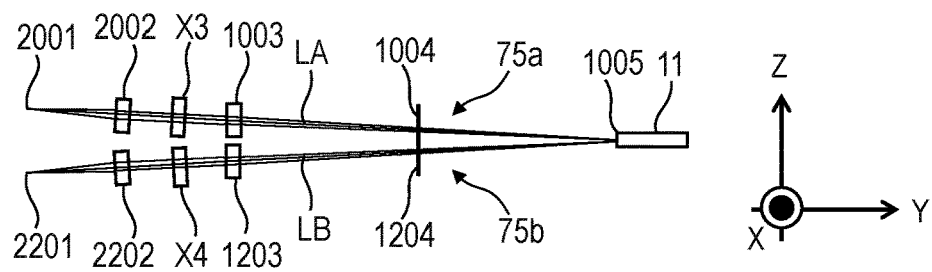
FIG. 9B is a partial developed view in a sub-scanning cross section of the light scanning apparatus according to the second embodiment.
Figure 9C:
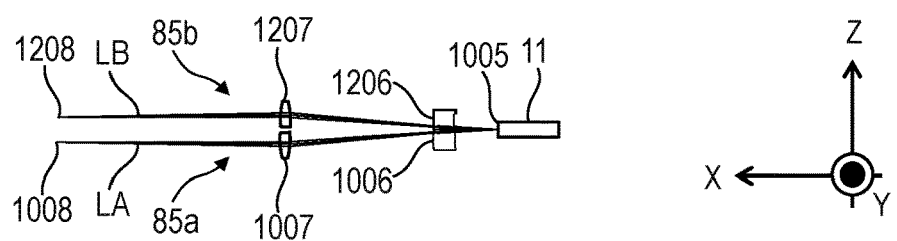
FIG. 9C is a partial developed view in the sub-scanning cross section of the light scanning apparatus according to the second embodiment.

FIG. 9B and FIG. 9C show developed views in the sub-scanning cross section of incident optical systems and scanning optical systems, respectively, which are included in the light scanning apparatus 20 according to the second embodiment.

In the light scanning apparatus 20 according to the present embodiment, first and second light sources 2001 and 2201 are provided in place of the first and second light sources 1001 and 1201, and first and second collimator lenses 2002 and 2202 are provided in place of the first and second collimator lenses 1002 and 1202.

Further, in the light scanning apparatus 20 according to the present embodiment, first and second optical elements X3 and X4 are newly provided between the first and second collimator lenses 2002 and 2202 and the first and second cylindrical lenses 1003 and 1203. Other configurations are the same as those in the light scanning apparatus 10 according to the first embodiment. Thus, the same members are denoted by the same reference symbols, and description thereof is omitted.

As each of the first and second light sources 2001 and 2201, a vertical cavity surface emitting laser (VCSEL) for emitting a light flux having a wavelength of $\lambda=790$ nm is used.

Polarized light of each of the light fluxes LA and LB emitted from the first and second light sources 2001 and 2201 is linearly polarized light substantially parallel to the main scanning cross section.

That is, the light fluxes LA and LB entering the deflecting unit 11 from the first and second light sources 2001 and 2201 at the time of reflection on the deflecting surface 1005 of the deflecting unit 11 have more P-polarized light components than S-polarized light components.

The first and second collimator lenses 2002 and 2202 convert the light fluxes LA and LB emitted from the first and second light sources 2001 and 2201, respectively, into parallel light fluxes.

In the first and second collimator lenses 2002 and 2202, no fine structure as that described in the first embodiment is formed.

Each of the first and second optical elements X3 and X4 is an optical element in which a polarizer and a parallel plate element having fine structures formed on both of the incident surface and the exit surface thereof are cemented to each other.

In the light scanning apparatus 20 according to the present embodiment, in order to further reduce the cost and improve the printing speed as compared to the light scanning apparatus 10 according to the first embodiment, a VCSEL having a large number of light emitting points is used as each of the first and second light sources 2001 and 2201.

In this case, when the VCSEL is used as each of the first and second light sources 2001 and 2201, the printing speed can be improved, but the illuminance in each of the first and second scanned surfaces 1008 and 1208 is increased along with the increase in the number of light emitting points.

Accordingly, there is a possibility that the first and second photosensitive drums 1008 and 1208 which have been used as the first and second scanned surfaces 1008 and 1208 in the light scanning apparatus 10 according to the first embodiment cannot be used.

At this time, in order to suppress such increase in illuminance, it is conceivable to adopt a method of newly providing a polarizer in each of the first and second incident optical systems 75a and 75b, but, in this case, the polarization states of the light fluxes LA and LB at the time of entering the deflecting unit 11 are changed.

Accordingly, there is a possibility that the light amount difference between the image heights in each of the first and second scanned surfaces 1008 and 1208 is increased.

In view of the above, in the light scanning apparatus 20 according to the present embodiment, the polarizer is newly provided in each of the first and second incident optical systems 75a and 75b, and an optical element having a fine structure is newly provided on the downstream side of the polarizer. In this manner, the light amount difference between the image heights is reduced.

Figure 10A:
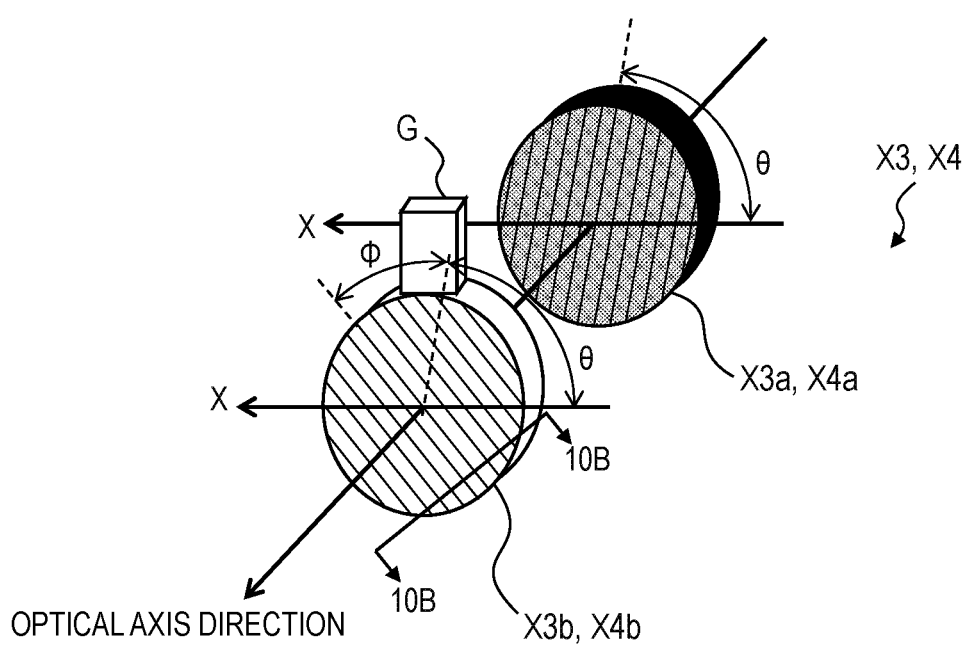
FIG. 10A is a schematic perspective view of an optical element included in the light scanning apparatus according to the second embodiment.

FIG. 10A shows a schematic perspective view of each of the first and second optical elements X3 and X4 provided in the light scanning apparatus 20 according to the present embodiment.

Figure 10B:
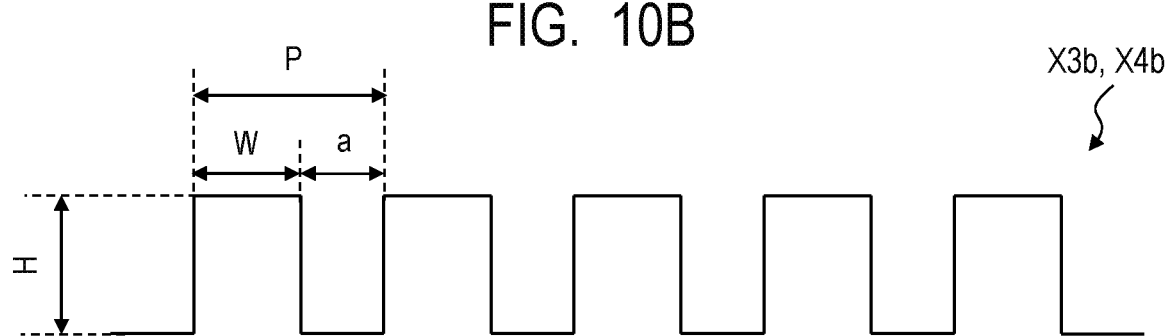
FIG. 10B is a schematic partially-enlarged cross sectional view of the optical element included in the light scanning apparatus according to the second embodiment.

Further, FIG. 10B shows a schematic partially-enlarged cross sectional view of first and second parallel plate elements X3b and X4b included in the first and second optical elements X3 and X4, taken along the line 10B-10B of FIG. 10A.

As illustrated in FIG. 10A, the first and second optical elements X3 and X4 include respective first and second polarizers X3a and X4a (a second optical element) for converting polarized light of each of the light fluxes LA and LB into linearly polarized light in a predetermined direction.

Further, the first and second optical elements X3 and X4 include the respective first and second parallel plate elements X3b and X4b (a first optical element) which each have a planar shape in which the incident surface and the exit surface are parallel to each other, and each have fine structures formed therein.

The incident surface and the exit surface of each of the first and second parallel plate elements X3b and X4b as used herein mean base surfaces on which the fine structures are formed.

In FIG. 10A, in order to facilitate the understanding of the configurations of the first and second optical elements X3 and X4, the first and second polarizers X3a and X4a and the first and second parallel plate elements X3b and X4b are illustrated so as to be spaced apart from each other, but both of them are actually cemented to each other.

Further, in the light scanning apparatus 20 according to the present embodiment, as illustrated in FIG. 10A, the first and second optical elements X3 and X4 are arranged so that the first and second polarizers X3a and X4a are arranged between the first and second light sources 2001 and 2201 and the first and second parallel plate elements X3b and X4b.

Further, in FIG. 10A, the diagonal lines in each of the first and second polarizers X3a and X4a indicate an orientation of a transmission axis, and the transmission axis is rotated by a transmission axis angle "θ" with respect to the X direction in the cross section perpendicular to the optical axis.

In addition, changing of the transmission axis angle "θ" allows each of the light amounts of the light fluxes LA and LB exiting from the first and second polarizers X3a and X4a to be adjusted.

Further, in FIG. 10A, the diagonal lines on the exit surface of each of the first and second parallel plate elements X3b and X4b indicate a direction in which protruding portions of the one-dimensional comb-shape in the formed fine structure extend, that is, the structure axis direction.

Although not shown in FIG. 10A, the same fine structure is formed also on the incident surface of each of the first and second parallel plate elements X3b and X4b.

The structure axis direction is rotated by the structure axis angle Φ with respect to a direction parallel to the transmission axis of each of the first and second polarizers X3a and X4a in the cross section perpendicular to the optical axis.

In addition, an angle between the direction of the linearly polarized light of each of the light fluxes LA and LB exiting from the first and second polarizers X3a and X4a and the structure axis direction of the fine structure formed in each of the first and second parallel plate elements X3b and X4b, that is, the structure axis angle Φ becomes a parameter of changing the polarization state of each of the light fluxes LA and LB at the time of entering the deflecting unit 11.

As illustrated in FIG. 10B, on each of the incident surface and the exit surface of each of the first and second parallel plate elements X3b and X4b, a one-dimensional comb-shaped fine structure having a height H, a width W, a period P, and a filling width "a" is formed.

In this case, the width W, the period P, and the filling width "a" have a relationship of P=W+a.

Specifically, the height H, the period P, and the filling width "a" of the fine structure formed in each of the first and second parallel plate elements X3b and X4b are 900 nm, 688 nm, and 300 nm, respectively.

Further, the first and second parallel plate elements X3b and X4b are each made of a material of ZEONEX (trademark) K22R, and hence the refractive index "n" is 1.52819 (wavelength λ=790 nm).

Thus, when those values are substituted into Expression (12) to Expression (14), the phase lag Δ in each of the incident surface and the exit surface of each of the first and second parallel plate elements X3b and X4b can be obtained as 98.2 nm.

In addition, a value obtained by dividing the phase lag Δ by the wavelength λ=790 nm of each of the light fluxes LA and LB becomes Δ/λ=98.2 nm/790 nm=1/8.0, and hence the fine structure formed on each of the incident surface and the exit surface of each of the first and second parallel plate elements X3b and X4b has an effect equivalent to that of a λ/8 plate.

That is, the first and second parallel plate elements X3b and X4b each have an effect equivalent to that of a λ/4 plate as a whole.

For example, when the structure axis angle Φ of the fine structure formed in each of the first and second parallel plate elements X3b and X4b is set to 45°, the polarization state of each of the light fluxes LA and LB exiting from the first and second parallel plate elements X3b and X4b becomes circular polarization.

However, the light amount difference between the image heights in each of the first and second scanned surfaces 1008 and 1208 is not always sufficiently reduced by changing the polarization state of each of the light fluxes LA and LB exiting from the first and second parallel plate elements X3*b* and X4*b* to circular polarization.

That is, the structure axis angle Φ is set depending on the transmission axis angle "θ" of each of the first and second polarizers X3*a* and X4*a* so that the light amount difference between the image heights is sufficiently reduced. In this manner, the polarization state of each of the light fluxes LA and LB exiting from the first and second parallel plate elements X3*b* and X4*b* is set to appropriate elliptical polarization.

In the light scanning apparatus 20 according to the present embodiment, the phase lag Δ of the fine structure formed on each of the incident surface and the exit surface of each of the first and second parallel plate elements X3*b* and X4*b* is increased so that the polarization state of each of the light fluxes LA and LB exiting from the first and second parallel plate elements X3*b* and X4*b* becomes close to circular polarization.

In this manner, even when the transmission axis angle "θ" of each of the first and second polarizers X3*a* and X4*a* slightly changes, the effect of reducing the light amount difference between the image heights in each of the first and second scanned surfaces 1008 and 1208 does not greatly change.

Further, when the height H of the fine structure formed in each of the first and second parallel plate elements X3*b* and X4*b* is increased, the phase lag Δ of the fine structure can be increased.

Meanwhile, it is difficult to manufacture the first and second parallel plate elements X3*b* and X4*b* so as to have the fine structure with the height H of 1,000 nm or more.

Accordingly, in the light scanning apparatus 20 according to the present embodiment, the fine structure is formed on both of the incident surface and the exit surface of each of the first and second parallel plate elements X3*b* and X4*b*.

In this manner, while the height H of the fine structure of each of the incident surface and the exit surface is set to be less than 1,000 nm, a large phase lag Δ can be ensured as a whole of each of the first and second parallel plate elements X3*b* and X4*b*.

In the light scanning apparatus 20 according to the present embodiment, as described above, the fine structure is formed so as to be equivalent to the λ/4 plate in each of the first and second parallel plate elements X3*b* and X4*b*, but the present embodiment is not limited thereto.

That is, in order to set the light amount difference between the image heights in each of the first and second scanned surfaces 1008 and 1208 to a desired amount, it suffices that the phase lag Δ of the fine structure be set to an appropriate amount.

In the light scanning apparatus 20 according to the present embodiment, the first and second polarizers X3*a* and X4*a* and the first and second parallel plate elements X3*b* and X4*b* are integrated with each other so that the light amount of each of the light fluxes LA and LB can be slightly adjusted only by changing the transmission axis angle "θ" while maintaining the setting of the polarization state of each of the light fluxes LA and LB at the time of entering the deflecting unit 11 to substantially circular polarization.

However, when the first and second polarizers X3*a* and X4*a* and the first and second parallel plate elements X3*b* and X4*b* are formed integrally with each other, the light amount difference between the image heights in each of the first and second scanned surfaces 1008 and 1208 changes depending on the transmission axis angle "θ".

Accordingly, when it is difficult to accept such variations in light amount difference between the image heights depending on the transmission axis angle "θ", the first and second polarizers X3*a* and X4*a* and the first and second parallel plate elements X3*b* and X4*b* may be formed of separate members.

In the light scanning apparatus 20 according to the present embodiment, the incident surface of each of the first and second collimator lenses 2002 and 2202 has a curved surface shape, and hence it is difficult in terms of manufacture to provide the fine structure on the incident surface of each of the first and second collimator lenses 2002 and 2202.

Thus, in the light scanning apparatus 20 according to the present embodiment, instead of forming the fine structure on each of the incident surface and the exit surface of each of the first and second collimator lenses 2002 and 2202, the first and second parallel plate elements X3*b* and X4*b* each having the fine structure formed therein are provided.

However, the present embodiment is not limited thereto, and a fine structure may be further provided on the incident surface having the curved surface shape of each of the first and second collimator lenses 2002 and 2202.

Further, in order to ensure a large phase lag Δ of the fine structure, in addition to provision of the first and second parallel plate elements X3*b* and X4*b* each having the fine structure formed therein, the fine structure may be formed on the incident surface or the exit surface of each of the first and second collimator lenses 2002 and 2202.

The configuration in which the first and second parallel plate elements X3*b* and X4*b* having the fine structures formed therein are newly provided as in the light scanning apparatus 20 according to the present embodiment has an advantage in that the configuration is easily applicable to an existing product because, even when an environment temperature changes or a manufacturing error is caused, the influence on the imaging performance is small, but also has a disadvantage in that the component cost is increased.

At this time, when common first and second parallel plate elements X3*b* and X4*b* can be provided in a plurality of existing products, there is a possibility that this configuration has more advantage in cost as compared to a configuration in which the fine structure is formed on the optical element provided in each of the plurality of existing products.

Further, in a case of a configuration in which the first and second parallel plate elements X3*b* and X4*b* are provided on the downstream side of the first and second collimator lenses 2002 and 2202 as in the light scanning apparatus 20 according to the present embodiment, even when the environment temperature changes or the manufacturing error is caused, the influence on the imaging performance is significantly small.

The incident surface and the exit surface of each of the first and second parallel plate elements X3*b* and X4*b* are not required to be completely flat, and may have a gentle curvature.

The extending directions of the respective protruding portions of the one-dimensional comb shape formed on the incident surface and the exit surface of each of the first and second parallel plate elements X3*b* and X4*b* provided in the light scanning apparatus 20 according to the present embodiment are parallel to each other, but the present embodiment is not limited thereto.

That is, the extending directions of the respective protruding portions of the one-dimensional comb shape may be set so that the light amount difference between the image heights in each of the first and second scanned surfaces 1008 and 1208 is appropriately reduced.

The light scanning apparatus 20 according to the present embodiment adopts the above-mentioned configuration when the VCSEL is used as each of the first and second light sources 2001 and 2201. In this manner, the increased light amounts of the light fluxes LA and LB are reduced, and the light amount difference between the image heights in each of the first and second scanned surfaces 1008 and 1208 is reduced.

However, the present embodiment is not limited thereto. For example, even when a photosensitive drum having high sensitivity is used as each of the first and second scanned surfaces 1008 and 1208, the above-mentioned configuration can be used.

That is, in such case, an optical element having a fine structure is provided when a polarizer is used to reduce the light amounts of the light fluxes LA and LB. In this manner, the light amount difference between the image heights in each of the first and second scanned surfaces 1008 and 1208 can be reduced.

According to the present invention, a small-sized light scanning apparatus with which uneven illuminance in a scanned surface can be suppressed can be provided.

While an exemplary embodiment has been described, it is to be understood that the present invention is not limited to the disclosed exemplary embodiment, and various modifications and changes can be made thereto without departing from the gist thereof.

Image Forming Apparatus

Figure 11:
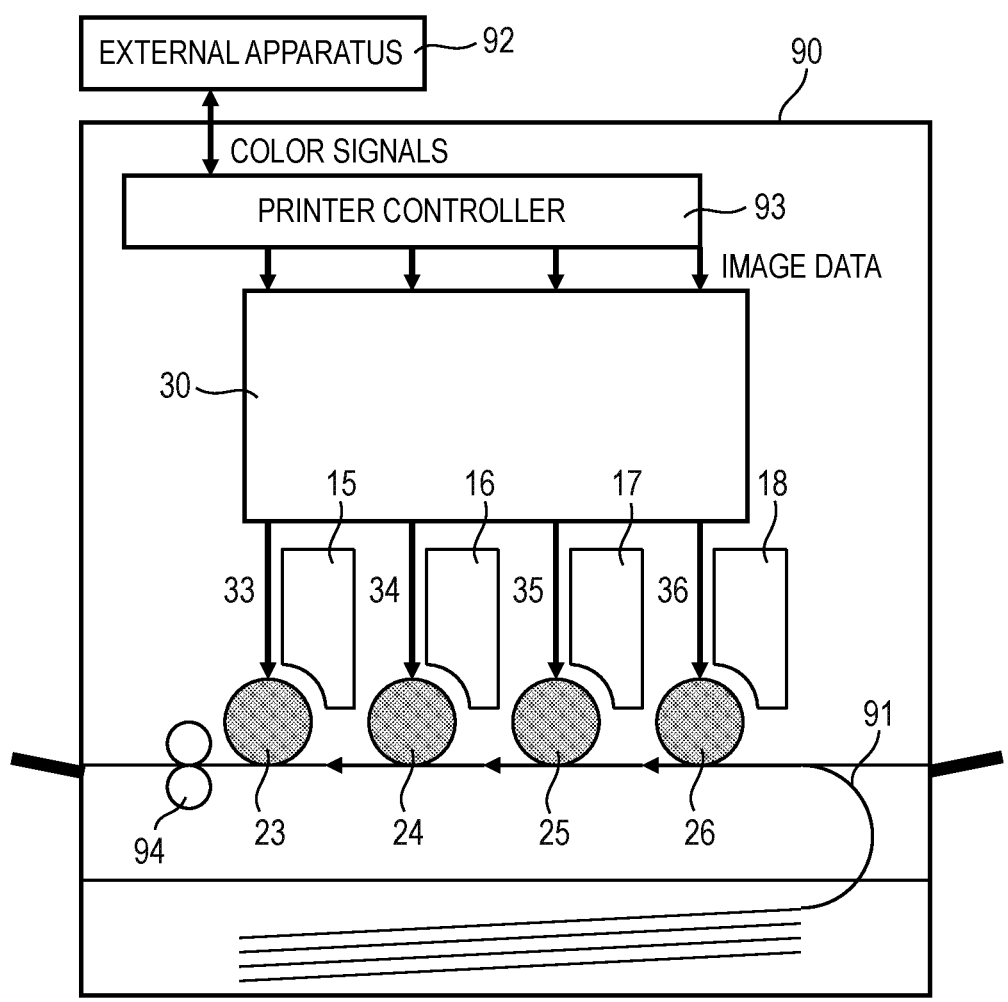
FIG. 11 is a sub-scanning cross sectional view of a main part of a color image forming apparatus according to the present invention.

FIG. 11 shows a sub-scanning cross sectional view of a main part of a color image forming apparatus 90 to which a light scanning apparatus 30 according to the first or second embodiment is mounted.

The image forming apparatus 90 is a tandem-type color image forming apparatus which records image information on a surface of each photosensitive drum being an image bearing member through use of the light scanning apparatus 30 according to the first or second embodiment.

The image forming apparatus 90 includes the light scanning apparatus 30 according to the first or second embodiment, photosensitive drums (photosensitive bodies) 23, 24, 25, and 26 each being an image bearing member, and developing units 15, 16, 17, and 18. The image forming apparatus 90 also includes a conveying belt 91, a printer controller 93, and a fixing unit 94.

Color signals (pieces of code data) of red (R), green (G), and blue (B) output from an external apparatus 92, for example, a personal computer is input to the image forming apparatus 90.

The input color signals are converted into pieces of image data (dot data) on cyan (C), magenta (M), yellow (Y), and black (K) by the printer controller 93 in the image forming apparatus 90.

The converted pieces of image data are each input to the light scanning apparatus 30. Then, light beams 33, 34, 35, and 36 modulated based on the pieces of image data are emitted from the light scanning apparatus 30, and the photosensitive surfaces of the photosensitive drums 23, 24, 25, and 26 are exposed to those light beams.

Charging rollers (not shown) which uniformly charge the surfaces of the photosensitive drums 23, 24, 25, and 26 are provided so as to be brought into abutment against the surfaces. Meanwhile, the light scanning apparatus 30 irradiates the surfaces of the photosensitive drums 23, 24, 25, and 26 charged by the charging rollers with the light beams 33, 34, 35, and 36.

As described above, the light beams 33, 34, 35, and 36 are modulated based on the pieces of image data on the respective colors, and the photosensitive drums 23, 24, 25, and 26 are irradiated with the light beams 33, 34, 35, and 36, to thereby form electrostatic latent images on the surfaces of the photosensitive drums 23, 24, 25, and 26. The formed electrostatic latent images are developed as toner images by the developing units 15, 16, 17, and 18 arranged so as to be brought into abutment against the photosensitive drums 23, 24, 25, and 26.

The toner images developed by the developing units 15 to 18 are transferred onto a sheet (a transferred material) (not shown) being conveyed on the conveying belt 91 in a superimposed manner by transferring rollers (a transferring unit) (not shown) arranged so as to be opposed to the photosensitive drums 23 to 26, to thereby form one full-color image.

As described above, the sheet onto which the unfixed toner images have been transferred is further conveyed to the fixing unit 94 provided on downstream of the photosensitive drums 23, 24, 25, and 26 (on the left side of FIG. 11). The fixing unit 94 is formed of a fixing roller including, in its inside, a fixing heater (not shown), and a pressurizing roller arranged so as to be brought into pressure contact with the fixing roller. The unfixed toner images on the sheet are fixed by heating the sheet conveyed from a transferring portion while pressurizing the sheet by a pressure contact portion between the fixing roller and the pressurizing roller. In addition, discharging rollers (not shown) are arranged on further downstream of the fixing roller, and discharge the fixed sheet to the outside of the image forming apparatus 90.

The color image forming apparatus 90 records image signals (pieces of image information) on the photosensitive surfaces of the photosensitive drums 23, 24, 25, and 26 corresponding to the respective colors of C, M, Y, and K through use of the light scanning apparatus 30, to print a color image at high speed.

As the external apparatus 92, for example, a color image reading apparatus including a CCD sensor may be used. In this case, this color image reading apparatus and the color image forming apparatus 90 form a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-039205, filed Mar. 14, 2023, which is hereby incorporated by reference herein in its entirety.

What is claimed is:

1. An apparatus comprising:
   a first element in which a first fine structure configured to change a polarization state of a first light flux from a first light source is formed on at least one of an incident surface or an exit surface thereof;
   a deflecting unit configured to deflect the first light flux that has passed through the first element to scan a first scanned surface in a main scanning direction; and
   a first optical system configured to guide the deflected first light flux to the first scanned surface,
   wherein the first fine structure on at least one of the incident surface or the exit surface of the first element includes a plurality of protruding portions each extending in a first direction, the plurality of protruding portions being arrayed in a second direction perpendicular to the first direction, and wherein the following condition is satisfied:

$$1/20 \le \Delta_1/\lambda_1 \le 1/6,$$

where $\Delta_1$ represents a phase difference between the first direction and the second direction of birefringence caused by the first fine structure on at least one of the incident surface or the exit surface of the first element, and $\lambda_1$ represents a wavelength of the first light flux.

2. The apparatus according to claim 1, wherein the first light flux emitted from the first light source is linearly polarized light.

3. The apparatus according to claim 2, wherein an angle between the first direction and a polarization direction of the linearly polarized light at a time of entering the first element is 10° or more.

4. The apparatus according to claim 1, wherein the first light flux at a time of entering the deflecting unit is elliptically polarized light.

5. The apparatus according to claim 1, wherein the first element is configured to convert the first light flux into a parallel light flux.

6. The apparatus according to claim 1, wherein the at least one of the incident surface or the exit surface on which the first fine structure is formed is a flat surface.

7. The apparatus according to claim 1, further comprising a second element configured to convert the first light flux before entering the deflecting unit into linearly polarized light.

8. The apparatus according to claim 7, wherein the second element is arranged between the first light source and the first element.

9. The apparatus according to claim 7, wherein the incident surface and the exit surface are flat surfaces that are parallel to each other.

10. The apparatus according to claim 7, wherein the first element and the second element are cemented to each other.

11. The apparatus according to claim 1, wherein the first fine structure is formed on both of the incident surface and the exit surface.

12. The apparatus according to claim 1, wherein the first element is configured to condense the first light flux in a sub-scanning cross section.

13. The apparatus according to claim 1, further comprising a third element in which a fine structure configured to change the polarization state of the first light flux is formed on at least one of an incident surface or an exit surface thereof.

14. The apparatus according to claim 13, wherein the third element is configured to condense the first light flux in a sub-scanning cross section.

15. The apparatus according to claim 1, wherein the plurality of protruding portions are the same as each other in at least one of a width of each protruding portion, a height of each protruding portion, or an interval between adjacent protruding portions.

16. The apparatus according to claim 1, wherein the at least one of the incident surface or the exit surface on which the first fine structure is formed has an optical power in at least one of a main scanning cross section or a sub-scanning cross section.

17. The apparatus according to claim 1, further comprising:
a fourth element in which a second fine structure configured to change a polarization state of a second light flux from a second light source is formed on at least one of an incident surface or an exit surface thereof; and
a second optical system configured to guide the second light flux deflected by the deflecting unit to a second scanned surface,
wherein the deflecting unit is configured to deflect the second light flux that has passed through the fourth element to scan the second scanned surface in the main scanning direction,
wherein the second fine structure on at least one of the incident surface or the exit surface of the fourth element includes a plurality of protruding portions each extending in a third direction, the plurality of protruding portions being arrayed in a fourth direction perpendicular to the third direction, and
wherein the following condition is satisfied:

$$1/20 \le \Delta_2/\lambda_2 \le 1/6,$$

where $\Delta_2$ represents a phase difference between the third direction and the fourth direction of birefringence caused by the second fine structure on at least one of the incident surface or the exit surface of the fourth element, and $\lambda_2$ represents a wavelength of the second light flux.

18. The apparatus according to claim 17, wherein a surface on which the first fine structure is provided in the first element and a surface on which the second fine structure is provided in the fourth element have the same shape as each other.

19. A forming apparatus comprising:
the apparatus of claim 1;
a developing unit configured to develop, as a toner image, an electrostatic latent image formed on the first scanned surface by the apparatus;
a transferring unit configured to transfer the developed toner image onto a transferred material; and
a fixing unit configured to fix the transferred toner image to the transferred material.

20. A forming apparatus comprising:
the apparatus of claim 1; and
a printer controller configured to convert a signal output from an external apparatus into image data and input the image data to the apparatus.

* * * * *